(12) United States Patent
Yamaguchi et al.

(10) Patent No.: US 8,369,602 B2
(45) Date of Patent: Feb. 5, 2013

(54) LENGTH MEASUREMENT SYSTEM

(75) Inventors: Atsuko Yamaguchi, Kodaira (JP); Jiro Yamamoto, Tachikawa (JP); Hiroki Kawada, Tsuchiura (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1013 days.

(21) Appl. No.: 12/190,818

(22) Filed: Aug. 13, 2008

(65) Prior Publication Data
US 2009/0046896 A1 Feb. 19, 2009

(30) Foreign Application Priority Data
Aug. 17, 2007 (JP) .................. 2007-212532

(51) Int. Cl.
*G06K 9/00* (2006.01)
(52) U.S. Cl. ............ 382/145; 358/521; 345/428
(58) Field of Classification Search .......... 382/145
See application file for complete search history.

(56) References Cited

U.S. PATENT DOCUMENTS

| | | | | |
|---|---|---|---|---|
| 6,262,943 B1 * | 7/2001 | Clarke | .......... | 367/135 |
| 6,662,143 B2 | 12/2003 | Sonoda | | |
| 7,095,884 B2 | 8/2006 | Yamaguchi et al. | | |
| 7,230,723 B2 | 6/2007 | Yamaguchi et al. | | |
| 2003/0021463 A1 * | 1/2003 | Yamaguchi et al. | .......... | 382/145 |
| 2004/0075659 A1 * | 4/2004 | Taubin | .......... | 345/428 |
| 2005/0018258 A1 * | 1/2005 | Miyagi et al. | .......... | 358/521 |

FOREIGN PATENT DOCUMENTS

| | | |
|---|---|---|
| JP | 2000-093399 | 4/2000 |
| JP | 2006-215020 | 8/2006 |

OTHER PUBLICATIONS

"Unbiased Estimation of Linewidth Roughness", J. S. Villarrubia, et al.

* cited by examiner

*Primary Examiner* — Hadi Akhavannik
(74) *Attorney, Agent, or Firm* — Mattingly & Malur, P.C.

(57) ABSTRACT

Disclosed herewith is a length measurement system, which obtains a value closer to its true one when figuring out the size and edge roughness of a pattern from a noise-included pattern image. Among plural band-like regions representing a portion around an edge in an image respectively, the system calculates the dependency of the edge point position on the image processing parameter at each of a narrow width band-like portion and a wide width band-like portion to calculate an image processing condition that calculates each measured value closer to its true value or estimates the true value itself.

6 Claims, 16 Drawing Sheets

FIG. 1A
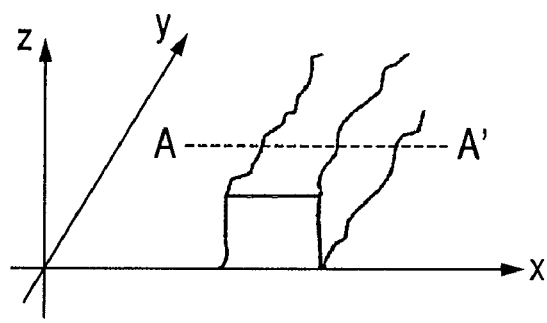
FIG. 1B
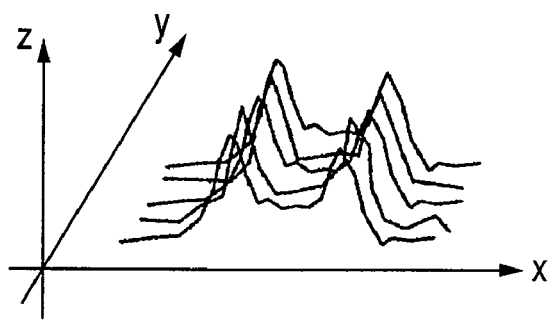
FIG. 1C
FIG. 1D
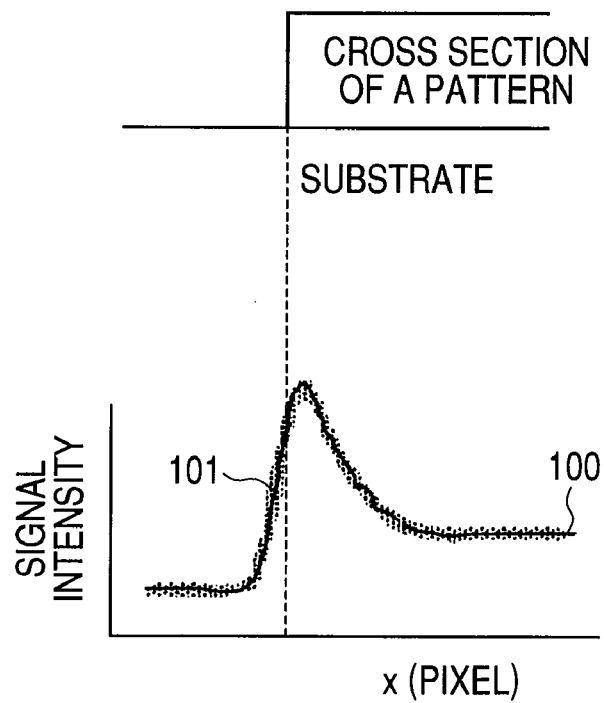

BEFORE SMOOTHING

AFTER SMOOTHING

LINE REGION (NUMBERS DENOTE NORMALIZED SIGNAL INTENSITY VALUES, UNIT: %)

LINE REGION

SPACE REGION (NUMBERS DENOTE NORMALIZED SIGNAL INTENSITY VALUES, UNIT: %)

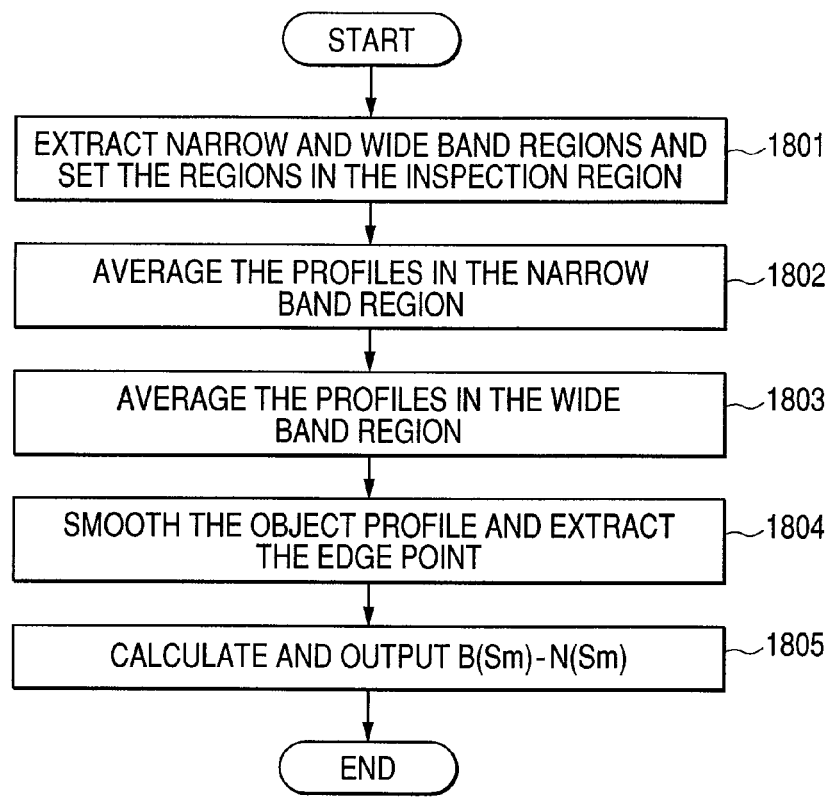
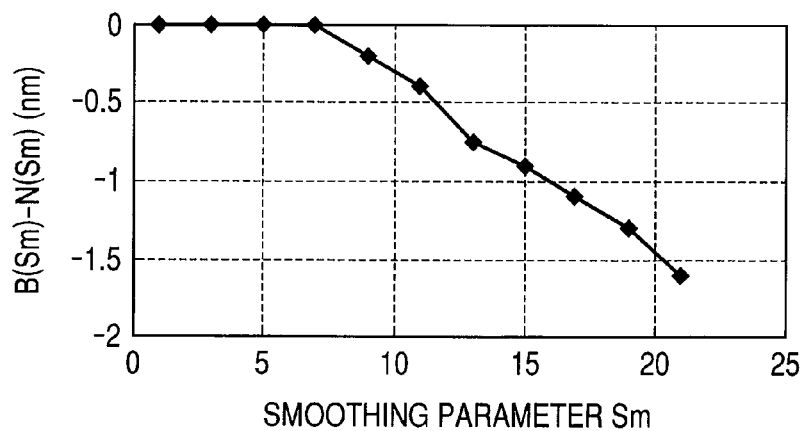

LENGTH MEASUREMENT SYSTEM

CLAIM OF PRIORITY

The present application claims priority from Japanese patent application JP 2007-212532 filed on Aug. 17, 2007, the content of which is hereby incorporated by reference into this application.

FIELD OF THE INVENTION

The present invention relates to a method for measuring sizes of patterns or rough shapes of pattern edges through non-destructive inspections with use of a scanning microscope and a method for inspecting micropatterns through measurements of pattern size fluctuations, as well as an inspection system and an evaluation method employed for the inspection system.

BACKGROUND OF THE INVENTION

In the industrial fields of semiconductors and other related products, there have been demands for more accurate measurements of micropattern shapes along with the progress of microfabrication in pattern processing sizes. In addition to those pattern sizes, it has also been required to evaluate the microroughness of pattern edges (edge roughness) that occur at random. Particularly, in the case of semiconductor processes, it has been found that device performance is affected significantly by local fluctuation of line widths, that is, line width roughness caused by such edge roughness on gates and wiring patterns, that is, line edge roughness or edge roughness appearing on both sides of lines. Furthermore, high precision measurements have also been required for size deviations of holes and dot patterns, as well as for the roughness of pattern edges.

A size (length) means a distance between two points (or two lines) on a user-specified sample. The degree of pattern edge roughness is usually represented by a standard deviation σ of the distribution of deviations from an ideal approximated shape of edge points (an approximated line calculated from a set of edge points in the case of a line edge) or its three-times value (3σ). Hereunder, unless otherwise specially noted, the above-described general 3σ will be referred to simply as "roughness" denoting a roughness evaluation index. The above descriptions can also apply to the difference between the maximum and minimum values of deviation from an ideally approximated shape, as well as to the average (deviation average) of absolute values of deviation, in addition to the integer multiples of the standard deviation σ.

When realizing the above described high precision size (length) measurement and high precision roughness measurement, what is the most important issue is removing noise influences. And when observing patterns with the use of a scanning microscope or visualizing the two-dimensional distribution data of the signal intensity obtained as a result of such observations (hereinafter, these will be described as observed images collectively), the images always include random noises, which affect the size (length) and roughness measurements.

There are two types of such random noise influences: influences on size (length) measurements and influences online width measurements. The influences on the size (length) measurements appear as variations of measured values and influences on line width measurements appear as observation of values larger than the true values, since noises outside the object line are apt to appear in signal profiles in the line width direction of secondary electron particles. Furthermore, according to the Proceedings of SPIE, Vol. 5752, pages 480 to 488, when there are many random noises, measured values come to increase in roughness measurements, and in the worst case, the measurement itself is disabled.

In order to minimize such noise influences to a negligible level, there have been considered three methods. The first method is integrating signals (this means observing signals for a long time to obtain a signal intensity that can have a satisfactorily high S/N ratio). The second method is averaging signals in a direction parallel to pattern edges of observed images (hereinafter, to be described as averaging). The third method is averaging signals in a direction vertical to the edges of observed images (hereinafter, to be described as smoothing). In the case of a non-line pattern, the second method carries out the averaging in a direction of an object edge (or in a tangential direction at each pattern edge point) and the third method carries out the averaging in a direction vertical to an object edge (or in a tangential direction at each pattern edge point).

Instead of the merit of noise reduction, however, those three methods come to have the following demerits.

The first method includes such demerits as an increase of inspection time (that lowers the production throughput) and sticking carbon, etc. on the observation spots due to irradiation for a long time of an electron beam, and pattern deformation (mainly shrinkage).

A demerit of the second to third methods is loss of information through the averaging. Because the averaging is considered to be equivalent to the vignette of images, part of the information included in the original two-dimensional distribution data might be lost through such averaging/smoothing. For example, in the case of a line pattern, if such averaging is applied to a pattern in a direction parallel to the pattern edges, the short period component of the roughness in the longitudinal direction of the pattern is lost. In the case of size (length) measurements, because it is just required to know the average value of sizes (lengths) within a comparatively long range in the longitudinal direction of the pattern, even when the short period component of the roughness is lost through such averaging, it does not cause any serious problems. In the case of roughness measurements, however, values to be obtained become smaller than their true ones, and thereby the reliability of the measured values comes to be lost. Consequently, it becomes difficult to detect a difference of roughness between two patterns, and thereby the size determination cannot be made accurately.

Other demerits of the third method are changes of size and roughness values due to the broadening of signal profiles (details will be described later) (broadening of the secondary electrons intensity distribution in a direction vertical to an object pattern edge). Consequently, in any of the size (length) and roughness measurements, the third method is unable to make determinations accurately for the size difference between two patterns just like the demerit mentioned above.

Conventionally, in order to remove noise influences, all the above-described three methods have been combined. In recent years, however, there have often been used samples of which resistance to irradiation of a charged electron beam is weak as objects of such size (length) and roughness measurements. In such cases, the deformation of patterns, which is a demerit of the first method, comes to arise as a problem. And in order to solve this problem, it has been required to reduce the number of signal integrations to as little as possible to obtain images to be observed. As a result, the image processings of the second and third methods have come to be considered more as important means, and accordingly the side effect of those methods have also come up as a problem.

At present, in the case of size (length) measurements, it is negligible that high frequency components in the pattern edge fluctuation are lost. So, the second method is employed to average a long region formed along an object edge, thereby reducing noise influences. On the other hand, in the case of roughness measurements, for example, the Proceedings of SPIE, Vol. 5752, pages 480 to 488 discloses a method that obtains the same pattern image twice to process the image data. JP-A No. 2006-215020 also discloses a new evaluation method that estimates a noise component included in a roughness measured value by premising existence of the characteristics of the noise and those of the edge roughness to be observed, thereby estimating a roughness measured value while there is no noise without using the first and second methods. Using these techniques could successfully avoid the demerit of the first method, which is damage to the observation samples, and the demerit of the second method, which is the loss of the high frequency components.

SUMMARY OF THE INVENTION

Both of the methods disclosed in the Proceedings of SPIE, Vol. 5752, pages 480 to 488 and in JP-A No. 2006-215020 are effective if the noise level is under a certain value. If the noise level goes over a certain value, however, the above methods cannot cope with any of the size (length) and roughness measurements. This is because there are too many noises to find values without smoothing. What is considered to be a problem here is that deformation or distortion of signal profiles caused by averaging or smoothing in the vertical or normal direction of an object pattern edge is much more serious than the influence on signal profiles caused by averaging in the parallel or tangential direction of the pattern edge. Hereinafter, there will be described the difference between the influences of those averaging and smoothing processes on signal profiles with reference to FIG. 1.

FIG. 1A is a graph showing an explanatory view of a line pattern of which size and roughness are to be measured. In this case, a convex structure having a predetermined width in the x direction is extended in the y direction. This convex structure is an object line pattern to be measured. If a secondary electron image or a reflected electron image is detected when an electron beam is scanned on the top face (z-axis direction) of this line pattern, the detected signal intensity distribution in the x direction (a line profile in the x direction) becomes approximately as shown in FIG. 1B. A cross-sectional view of the line pattern shown in FIG. 1A is taken on line A-A' as shown in FIG. 1C. To simplify the drawing, in FIG. 1C, only the region around the left edge of the line (closer to the A of the A-A' cross-sectional view) is shown. FIG. 1D is an explanatory view of the signal profile corresponding to FIG. 1C.

If secondary electrons are used to obtain signal profiles, a lot of those secondary electrons are generated around the edges of the convex structure. Thus, higher signal intensity can be obtained. As a result, the object signal profile, when it is obtained by scanning an electron beam from the top face of the pattern shown in FIG. 1C, comes to become a curve having its peak around the edge as shown in FIG. 1D. Furthermore, the line profile to be obtained has a fluctuation component caused by the roughness of the line pattern side wall. And as shown with 100 in FIG. 1D, if signal profiles having short period components are averaged in a range in the y direction, the fluctuation components to be caused by roughness are distributed within a range, for example, as shown with a spotting portion 101 in FIG. 1D.

As to be understood in the comparison between the spotting portion 101 in FIG. 1D and the signal profile 100, after the averaging in the y direction, the profiles are also averaged in the x direction. However, the range is narrower in comparison with the maximum value of the roughness of the line pattern in the y direction, so the averaging does not affect the shapes of those profiles so much. In spite of this, when averaging profiles in the x direction, particularly when smoothing profiles to a level that can reduce the random noise influence satisfactorily, the averaging comes to be carried out in the x direction in a much wider range in comparison with the maximum value of the roughness in the y direction. Thus, shapes of signal profiles themselves come to be damaged.

In order to avoid such demerits of the smoothing, conventional methods have also been improved to minimize the smoothing level. However, there have been no methods to estimate quantitatively how much such smoothing makes image data blur with respect to size (length) or roughness measured values. And there have also been no methods for estimating true values (noise influence free values to be obtained without smoothing). This is why it has been impossible to check the suitability of measured values of roughness calculated by using smoothed data. Consequently, there have been conventionally some cases in which no difference is recognized between measured values of roughness even when there is a clear difference between sizes or degrees of roughness at the external views of two observed pattern images. (For example, when smoothing is made excessively, such a case occurs.) Furthermore, even when a size (length)/roughness measured value matches the impression received from the image, the value cannot be used for anything except for an index, since its true value is not known. This has been a problem.

Under such circumstances, it is an object of the present invention to provide a method capable of finding a minimum necessary range of smoothing (optimizing the smoothing parameters) to obtain proper size (length) or roughness measured values, thereby suppressing changes of size (length) and roughness that might otherwise occur due to the smoothing. It is another object of the present invention to provide a method capable of measuring true sizes or true roughness from an observed image obtained as usual (an image of which edges cannot be calculated without smoothing, since it contains noise of such a degree). It is still another object of the present invention to provide a system that employs such methods.

In order to achieve the above object of optimizing the smoothing parameters and figuring out true values, the present invention presents a solution to each of size (length) measurements and roughness measurements using five calculation methods and a system that employs these methods. The five calculation methods are:

(1) A method that obtains smoothing conditions to obtain measured values satisfactorily closer to their true values (first method)

(2) A method that estimates true size (length) values (second method)

(3) Two types of methods that obtain smoothing conditions to obtain measured values satisfactorily closer to their true values (third and fourth methods)

(4) A method that estimates true roughness values (fifth method)

Hereunder, there will be described those five methods in detail after describing the following two items: definition of smoothing and principles for removing noise influences from roughness measurements. In order to simplify the description, only the edge roughness of line patterns, that is, line edge roughness will be described in this specification. The present invention can also apply to line width roughness and hole roughness, of course.

At first, the two-dimensional signal intensity distribution of an object pattern to be measured is defined as l(x, y). The 'y' means a variable representing a position on an image in the vertical direction and both 'x' and 'y' are counted in units of pixels and represented by integers. A line pattern is disposed so that its edges are in parallel in the y direction. A signal profile means a functional shape when the y value is fixed and l(x, y) is regarded as a function of the 'x'. Smoothing means obtaining l'(x, y) by converting this l(x, y) as represented in the following equation.

$$l'(x, y) = \sum_{k=x-(Sm-1)/2}^{k=x+(Sm-1)/2} l(k, y) W_{Sm}(k-x) \quad \text{(Equation 1)}$$

For example, if data to be subjected to an arithmetic processing is two-dimensional intensity data of pixels, the arithmetic processing represented by the above equation multiplies the pixels at each point by the weight $W_{sm}(x)$ represented by a predetermined function and adds up the results within a range of k: $x-(Sm-1)/2$ to $x+(Sm-1)/2$. The 'Sm' is a parameter (unit: pixels) equivalent to the broadening of a signal region to be smoothed. The Sm is also equivalent to a degree of the blur of an image approximately in the x direction. Furthermore, the Sm is equal to a difference between the maximum value $k_{max}$ of k and the minimum value $k_{min}$ of k and takes an odd number. Hereunder, the Sm will be referred to as a smoothing parameter. The function $W_{sm}(x)$ is a distribution function having a weight for each pixel. The $W_{sm}(x)$ changes in accordance with the object pixel position in the x direction. The $W_{sm}(x)$ also changes in accordance with the Sm value.

FIG. 2A is a concept diagram showing a relationship between a smoothing parameter and a signal profile shape. The signal profile shown in FIG. 2A is l'(x, y) smoothed with Sm=1, 3, 5, and 7 sequentially from top to bottom. In the signal profile of Sm=1, the small white circle denotes a pixel at $x=x_i$ assuming a point $x=x_i$ on the x axis. In FIG. 2A, each white circle is larger than the actual pixel size to emphasize the existence of the pixel. The Sm=3 signal profile is obtained by averaging the three points including the object point and other two points at both sides thereof with respect to each point of the original signal profile (that is not smoothed yet). In this averaging process, only three points are subjected to the averaging, so three smoothing parameters are used. How to obtain such a signal profile and the meaning of the Sm are also true to the signal profiles of Sm=5 and 7. And in order to understand whether or not a smoothing parameter is within the range of an object pixel to be used for averaging by intuition, the Sm is denoted with a bar that is equivalent to an extension of pixels around $x=x_i$ in FIG. 2A.

FIG. 2B shows signal profiles of Sm=1, 9, and 13 after they are smoothed and normalized. The horizontal solid line in FIG. 2B denotes a threshold value used to determine each edge point. The x coordinate at an intersection point between each profile and this threshold value is equivalent to an edge point. It is understood that when smoothing increases the Sm value, the peak is expanded in width. It is also understood how an edge point (x coordinate) moves to the left side of the graph, that is, outside the line when the Sm value increases.

As for the smoothing parameter, various types of distribution functions can be used with it. For example, in the case of the smoothing parameter Sm=1, the following δ function is used.

$$W_1(x) = \delta(x) \quad \text{(Equation 2)}$$

As another example of the function $W_{sm}(x)$, the rectangle window function shown in FIG. 3A can be used.

$$W_{sm}(x) = \frac{1}{2Sm} \quad -Sm \leq x \leq Sm \quad \text{(Equation 3)}$$
$$= 0 \quad x < -Sm, \; Sm < x$$

The Gaussian function shown in FIG. 3B can also be used.

$$W_{sm}(x) = \frac{1}{Sm\sqrt{2\pi}} \exp(-x^2/2Sm^2) \quad \text{(Equation 4)}$$

There are also other functions usable as the function $W_{sm}(x)$.

Except for noise reduction, signal profile structures (the peaks and valleys of signal profiles) are most affected by smoothing; smoothing makes them blur. For example, as shown in FIG. 2A, the signal profile has its peak near an edge, but when the signal profile goes through smoothing, this peak comes to blur, thereby the peak is broadened (hereinafter, such a phenomenon will be referred to as peak broadening). Although it depends on the edge definition and the signal profile shape, in many cases, each edge point position is shifted outside the subject line pattern due to this peak broadening.

Because the signal profile structure blurs in such a way, the pattern size also changes after smoothing. In most cases of line width measurements, each signal profile is broadened, so the size (length) values increase.

Next, there will be described roughness values that change due to smoothing. How much an edge point position is shifted by the broadening as described above is determined by the peak width and shape of the original signal profile. Generally, the narrower the peak width is, the more the edge point position is shifted. Consequently, a relationship between edge point positions on two signal profiles (signal profiles l(x, $y_1$), l(x, y) obtained by cutting two signal profiles represented as l(x, y) with $y=y_1$, $y_2$ is changed by smoothing as follows.

At first, if the two signal profiles are the same in shape, they are shifted equally. Thus, the distance in the x direction is also the same between those signal profiles. Consequently, their roughness values also remain the same before and after the smoothing. Then, if the narrower peak width signal profile ($y=y_2$ signal profile here) is outside the object line, the edge points will be changed after the smoothing as shown in FIG. 4B while they are as shown in FIG. 4A before the smoothing. The difference Δ between those edge points increases significantly after the smoothing. This means that smoothing increases the roughness value. On the contrary, if the wider peak width signal profile is outside the line, smoothing decreases the roughness value.

In the case of actual pattern images, these three cases coexist along the line. It has thus been difficult to estimate how smoothing would change a roughness value that represents an average value of the roughness within a range on the subject line.

The influence of image noise on roughness values appears as an increase (bias) of observed values. When finding a true value of roughness, therefore, such a bias must be evaluated quantitatively so as to be removed from the roughness measured value. The Proceedings of SPIE, Vol. 5752, pages 480 to 488 discloses a method that calculates such a bias value directly by obtaining plural images of a pattern, then by extracting the edge points equivalent to the same positions on the pattern from those images. JP-A No. 2006-215020 also discloses a method that estimates a bias amount from one image by providing a certain assumption for the high frequency spectrum of roughness. And because those methods are useful to remove the bias without substantial deformations of signal profiles that might otherwise occur due to averaging and smoothing, those methods can thus obtain noise influence free roughness values. Those methods may also be combined with the five calculation methods of the present invention in some cases.

Each of the above methods premises that "noise causes object edge points to be measured to be distributed around their true edge points respectively in accordance with the law of probability". When there is much noise, smoothing is always required. For example, in the case of an image of which the S/N ratio is extremely low, smoothing is indispensable to determine the positions of object edge points. Even in the case of an image that does not contain so much noise, smoothing is required up to a certain degree to remove the noise-caused bias. Noise might rarely cause high bright pixels to appear in space regions. This is because one pixel signal (to appear like a spike on a signal profile) is mistaken as a peak corresponding to an edge if no smoothing is made. The smoothing level can be lower in this case than that required when a roughness value is found without noise removal processings. Consequently, in the case of roughness measurements, quantitative evaluation is indispensably required for the influence of smoothing.

Next, there will be described the first and second calculation methods employed for size (length) measurements. In many cases of size (length) measurements, signals can be averaged up to a satisfactory level. (The reason why both smoothing and averaging are required is to reduce the occurrence of measurement variations and shorten the inspection time.) And because each edge point is usually defined outside the peak of an object signal profile (in a region having no pattern), smoothing causes the pattern size to increase monotonically.

In the case of the first method, therefore, averaged two-dimensional intensity data is then smoothed by another changed-over Sm value to calculate the edge point or size (length) value with respect to the two-dimensional intensity data corresponding to each Sm value, thereby finding the dependency X(Sm) of each edge point on the Sm value or the dependency D(Sm) of the size (length) value on the Sm value. If the X(Sm) or S(Sm) is already known, the influence of smoothing on the size (length) measurement can be evaluated. Consequently, if this operation is carried out once before starting an object measurement and the Sm used for size (length) measurements is determined with reference to the Sm dependency data X(Sm) or D(Sm), then accuracy can be assured for size (length) measurements. Furthermore, it is also possible to set a smoothing parameter to the maximum Sm value that can suppress the allowable size (length) error within D(Sm)−D(1) or the maximum Sm value that can suppress the allowable size (length) error within twice of X(Sm)−X(1) without checking the dependency of X or D on the Sm value to determine the Sm value. Those maximum Sm values are found beforehand.

In the case of the second method, the D(Sm) is found beforehand, for example, from experiences or through an electron beam locus simulation, then the object size (length) at Sm=1 is estimated through fitting or extrapolation.

Next, there will be described principles of the present invention with respect to a calculation method employed for roughness measurements. First, how smoothing affects edges will be described, and then the principles of the third to fifth methods of the present invention will be described. It is premised here that there is no noise. After that, there will be described some notes and additional processings to handle actual images containing noises.

As described above, how much an edge point is to be shifted depends on the width and shape of the peak of the subject signal profile. In most cases, however, the narrower the peak width is, the more the edge point shifting depends on the Sm value. Consequently, hereinafter, it will be described in this specification that a signal profile of which edge point shifting depends more on the Sm value is a signal profile having a narrow peak width and a signal profile of which edge point shifting depends less on the Sm value is a signal profile having a wide peak width.

As described above, smoothing reduces the difference Δ between positions of edge points in some cases and increases the difference in other cases. FIG. 5 (5A and 5B) shows an example of a reduction case. FIG. 5A is a contour chart of a normalized signal intensity case and the horizontal direction denotes the x direction of the pattern image. FIG. 5B is a cross-sectional view of the pattern shown in FIG. 5A. It is premised here that spin compensation is made for the contour chart. In the example shown in FIG. 5, the edge point on the signal profile having a wide peak width originally is positioned farther from the line than that on the signal profile having a narrow peak width originally. The signal profile positioned at $L_1$ in the figure is the widest in the section while the signal profile positioned at $L_2$ is the narrowest. FIG. 6 shows an edge extracted from this pattern image at a threshold value 50%. And when smoothing is made for the image, the edge point positioned at L1 does not move so much while the edge point positioned at L2 moves outward significantly. Consequently, the roughness of the edge is reduced. This means that smoothing reduces roughness values. FIG. 7A shows an example of the contour chart in which smoothing increases roughness values. FIG. 7B shows a cross-sectional view corresponding to FIG. 7A. And FIG. 8 shows an extracted edge.

Actually, the above two cases coexist on one line edge. And which is which can be roughly identified. Hereinafter, one type that reduces roughness values will be represented as type A and the other type that increases roughness values will be represented as type B. In the following descriptions, the noise influence free roughness value (3σ) will be represented as R.

Hereinafter, the edge point having the largest x coordinate value (positioned at the right side, that is, closer to the line) will be described as x_max while the edge point having the smallest x coordinate value will be described as x_min. Here, smoothing does not change the y coordinate value of the signal profiles that have both x_max and x_min. The signal profile is assumed to have the widest or narrowest peak width. If B(Sm) and N(Sm) are defined for the dependency of the edge points on smoothing with respect to the signal profiles having the widest and narrowest peak widths respectively, the x_max comes to exist on $L_2$ and the x_min comes to exist on $L_1$ in type A, so N(Sm) and B(Sm) are calculated as follows.

$N(Sm) = x\_\max(Sm) - x\_\max(1)$ $B(Sm) = x\_\min(Sm) - x\_\min(1)$ (Equation 5)

On the other hand, the B(Sm) and N(Sm) described above are reversed in type B. The N(Sm) and B(Sm) values depend on the shape of l(x, y) at $L_1$ and $L_2$, the shape of the smoothing weight function $W_{sm}(x)$, and the definition of edge points. Generally, the relationship becomes N(Sm)<B(Sm). Here, it is assumed that equation 6 is satisfied with respect to the change of the Sm value.

$$R(Sm) \propto x\_max(Sm) - x\_min(Sm) \quad \text{(Equation 6)}$$

The comparison constant is assumed as α. If the right side of the equation is represented as Δ(Sm) to simplify the description, the R(Sm) is calculated as follows.

$$R(Sm) = \alpha \cdot \Delta(Sm) \quad \text{(Equation 7)}$$

$$R(1) = \alpha \cdot \Delta(1) \quad \text{(Equation 8)}$$

Then, equation 7 is divided by equation 8.

In the case of type A, the calculation will be made as follows.

$$\begin{aligned} \frac{R(Sm)}{R(1)} &= \frac{\Delta(Sm)}{\Delta(1)} \\ &= \frac{x\_max(Sm) - x\_min(Sm) - x\_max(1) + x\_min(1) + x\_max(1) - x\_min(1)}{\Delta(1)} \\ &= \frac{x\_max(Sm) - x\_max(1) - \{x\_min(Sm) - x\_min(1)\} + \Delta(1)}{\Delta(1)} \\ &= \frac{N(Sm) - B(Sm)}{\Delta(1)} + 1 \end{aligned} \quad \text{(Equation 9)}$$

Similarly, in the case of type B, calculation is made as follows.

$$\frac{R(Sm)}{R(1)} = \frac{\Delta(Sm)}{\Delta(1)} = \frac{B(Sm) - N(Sm)}{\Delta(1)} + 1 \quad \text{(Equation 10)}$$

(However, the case in which the Sm value is too large, thereby assuming x_max<x_min is excluded.) B(Sm)−N(Sm) takes 0 or a positive value, so smoothing reduces roughness values in type A and increases roughness values in type B. This is represented without any contradiction in the above equations. If the roughness functions B(Sm) and N(Sm) in types A and B are represented as $R_i(Sm)$, $B_i(Sm)$, $N_i(Sm)$ (i=A or B), the calculation will be made as follows.

$$R_i(Sm) - R_i(1) = \pm \frac{R_i(1)}{\Delta_i(1)}(B_i(Sm) - N_i(Sm)) \quad \text{(Equation 11)}$$

Next, there will be described the third calculation method of the present invention on the bases of the above calculation result. The signal profile in a roughness measurement region is type A or B, so the dependency of the roughness on the Sm value satisfies the following equation.

$$|R(Sm) - R(1)| \le \frac{R(1)}{\Delta(1)}(B(Sm) - N(Sm)) \quad \text{(Equation 12)}$$

If consideration is taken of the relationship between the standard deviation σ and the maximum/minimum value of distribution (FIG. 9), the relationship will satisfy the following condition.

$$\frac{\Delta}{2} > \sigma = \frac{R}{3} \quad \text{(Equation 13)}$$

So, the result will become as follows.

$$|R(Sm) - R(1)| < \frac{3}{2}(B(Sm) - N(Sm)) \quad \text{(Equation 14)}$$

Consequently, the signal profiles having the narrowest and widest peak widths are selected in the inspection region. Searching/extraction of those signal profiles can also be automated through arithmetic processings of pixels. Then, smoothing is carried out for the obtained signal profiles to calculate the N(Sm) and B(Sm) values, display the dependency data with respect to the Sm value, and then determine the Sm value used for inspection according to the dependency data. Otherwise, the coordinates of the object edge point are obtained in the inspection region to find the absolute value of the difference between the change amounts X_out(Sm) and X_in(Sm) of the edge points in the outermost and innermost positions with respect to the line caused by the increase of the Sm value, that is, to find |X_out(Sm)−X_in(Sm)| so as to be used instead of the B(Sm)−N(Sm) described above. If the object edge point is positioned at the left side of the line, X_out(Sm) becomes x_min(Sm)−x_min(1) in equation 5 and X_in(Sm) becomes x_max(Sm)−x_max(1), respectively.

|X_out(Sm)−X_in(Sm)| can also be found more quantitatively as follows. At first, the user is required to set an allowable value (described as $\Delta R_{ac}$) of |R(Sm)−R(1)| beforehand. On the other hand, the user searches the signal profiles having the narrowest and widest peak widths in the inspection region, then carries out smoothing for each of the signal profiles to calculate the N(Sm) and B(Sm) values. Then, the user is required to calculate the following expression.

$$\frac{3}{2}(B(Sm) - N(Sm)) \le \Delta R_{ac} \quad \text{(Equation 15)}$$

Then, the user is required to find the maximum Sm value that satisfies the result of the equation 15. The value is an Sm value that can reduce the signal profile broadening enough and minimize the noise (if the noise exists). In FIG. 9, the Δ is estimated too largely. Actually, the Δ can be approximated as follows.

$$\frac{\Delta}{2} \cong 3R \quad \text{(Equation 16)}$$

So, instead of the equation 15, the following equation 17 can be employed.

$$\frac{1}{6}(B(Sm) - N(Sm)) \le \Delta R_{ac} \quad \text{(Equation 17)}$$

More simply, it is also possible here to plot B(Sm)−N(Sm) with respect to Sm, search a region keeping the same status B(Sm)−N(Sm) on the data of the dependency of B(Sm)−N(Sm) on the Sm value, then set the Sm so that the B(Sm)−N(Sm) can fit in the region. Instead of the B(Sm)−N(Sm), |X_out(Sm)−X_in(Sm)| can also be used.

The fourth method calculates R(Sm)−R(1) directly from the two-dimensional intensity data, not from any of B(Sm)−N(Sm) and |X_out(Sm)−X_in(Sm)|. The fourth method then determines the Sm value with the use of R(Sm)−R(1) or selects the Sm value from the allowable error of R.

Next, there will be described the principle of the fifth method. At first, the roughness R(Sm) in the entire inspection region is approximated from the equation 18.

$$R(Sm)-R(1)=p(B(Sm)-N(Sm)) \quad \text{(Equation 18)}$$

In the equation, 'p' can take any of positive and negative values.

Thus, the fifth method carries out calculations as follows. At first, the method obtains signal profiles having the narrowest and widest peak widths in the inspection region, then carries out smoothing for each of those obtained signal profiles with the Sm values that are varied sequentially to calculate the N(Sm) and B(Sm) values. This procedure is the same as that of the third method. After that, the method smoothes each signal profile obtained from the object measurement region with the SM values that are varied sequentially to calculate the roughness value from the signal profile corresponding to each Sm value, thereby obtaining the R(Sm) value. At this time, there must be two or more Sm values (e.g., Sm=3, 5, 9). The data set (Sm, R(Sm)) obtained in such away is then subjected to fitting with the following equation.

$$y=p(B(x)-N(x))+r \quad \text{(Equation 19)}$$

The 'x' and 'y' in the above equation 19 are x and y coordinates assumed when the data (Sm, R(Sm)) is regarded as a point on the xy coordinate system; they are not positional coordinates of a point in an image file. This means that 'x' is a variable denoting an Sm value and 'y' is a variable denoting a roughness value. The equation 19 is a variation of the equation 18 and 'p' and 'r' are fitting parameters. The 'p' is a real number and the 'r' is a positive real number. After that, it is just required to regard the 'r' as the true roughness with the optimal function obtained by the fitting. |X_out(Sm)−X_in(Sm)| can also be used instead of B(Sm)−N(Sm).

In the third to fifth methods described above, it is premised that there is no noise. In the case of the third and fifth methods, when N(Sm) and B(Sm) or X_out(Sm) and X_in(Sm) are calculated, as well as when figuring out a roughness value with the fourth and fifth methods, much care should be paid, since it is expected that the values are affected by noise. Hereinafter, what such care should be taken for will be described.

When figuring out the B(Sm) and N(Sm), it is firstly required to obtain signal profiles having the widest and narrowest peak widths. There are two methods for this: obtaining those profiles by checking observation object images visually and by extracting them automatically. When using the former method, usually the secondary electrons intensity in the object image to be observed is converted to a gray scale of pixels beforehand. Consequently, each portion of which line pattern edge, that is, each portion having large secondary electron intensity looks white. Thus, the user is just required to look at the line pattern image and select the white band regions around the object pattern edge to specify the narrowest band region and the widest band region respectively.

Also when figuring out the X_out(Sm) and X_in(Sm), the user can obtain those regions by checking the object image visually or automatically. The user is just required to select the regions having outermost and innermost edge points with respect to the line respectively.

And when figuring out N(Sm) and B(Sm) or X_out(Sm) and X_in(Sm), it is required that noise is reduced to a degree that enables the result to be obtained even at Sm=1. However, the object of the present invention is to obtain correct edge positions from pattern images even at Sm=1, which has been impossible conventionally. This contradiction can be solved by increasing the averaging parameter value in the y direction (the number of pixels to be averaged in the vertical direction). Concretely, noise influence can be reduced by averaging signal profiles in the specified region. As described above, when figuring out a roughness value, if this averaging parameter value is increased, the high frequency roughness is lost. This is why it has been impossible to increase the averaging parameter value.

Even when figuring out N(Sm) and B(Sm) or X_out(Sm) and X_in(Sm), increasing this parameter value causes signal profiles having slightly different shapes to be added up, thereby the widths of those profiles come to be widened. This influence is not so large as to hide the dependency of the four functions on the Sm value. This means that the demerit of averaging is smaller than the demerit assumed when figuring out the roughness value. Furthermore, when specifying a region for which those four functions are calculated, it is possible to select a region that changes less in the y direction. Note that, however, if an excessively large region is specified for averaging, correct results cannot be assured.

If an edge point cannot be determined at Sm=1 unless the averaging value is set extremely largely, since the original image S/N ratio is extremely is low (the noise is excessively large), it is possible to change the observation conditions such as the number of signal integration times (when there is less noise unlike the images for which roughness values are calculated), photograph an image to calculate the N(Sm) and B(Sm) or X_out(Sm) and X_in(Sm), then find such functions as N(Sm) and B(Sm) or X_out(Sm) and X_in(Sm) beforehand.

The methods described above can therefore calculate function values even for the two-dimensional intensity data of Sm=1. In this case, the averaging parameter must be the same among the regions for figuring out the N(Sm) and B(Sm) or between the regions for figuring out the X_out(Sm) and X_in(Sm).

In the case of the fourth and fifth methods, the roughness R(Sm) to be measured should not contain any noise-caused bias components. In this case, when obtaining any image data, it is just required to set the number of signal integration times largely enough or remove the bias components as described in the Proceedings of SPIE, Vol. 5752, pages 480 to 488 and in JP-A No. 2006-215020.

The first method, as described above, calculates the position of an object edge point and its size with respect to various Sm values in the size (length) measurement. The use of the method is required just once before measuring many samples. This first method can thus keep the measurement throughput more constantly than the second method. On the other hand, the second method carries out fitting for the D(Sm) data with a function and estimates the size (length) at Sm=1. And the second method does not require any measurement beforehand nor Sm selection, although individual measurements take a slightly longer time than the first method. This is a merit of the second method.

The merit of the third method is shorter measurement time than that of the three roughness measurement methods (third, fourth, and fifth methods). If the image noise is low enough, for example, when figuring out a roughness value at Sm=5 or under, the measurement accuracy of the fourth method will be higher than that of the third method. The fifth method is simple and easy to use, since Sm setting is not required.

While all the above descriptions have been made for line patterns, the above calculation methods can also apply to other patterns such as contact hole patterns similarly. FIG. 10A shows an explanatory diagram of a typical contact hole pattern obtained through CD-SEM observation. FIG. 10B shows an exploded diagram of a white band of such a contact hole pattern in the θ direction. In FIG. 10A, the reference numerals are defined as follows: 1001 denotes a white band of a pattern edge, 1002 denotes the bottom of a hole, and 1003 denotes the external top face of the hole. And in order to simplify the description, the edge line of the contact hole is drawn as a perfect circle, but the actual contact hole pattern edge has some roughness, so such roughness comes to appear both outside and inside of the edge line of the white band 1001.

In the case of line pattern analysis, generally the y and x direction axes are defined as directions horizontal and vertical to the subject line respectively. In the case of hole pattern analysis, as shown in FIG. 10A, the center of the subject hole is defined as the origin and the positions of pixels configuring two-dimensional intensity data are represented as polar coordinates. And in the case of a hole pattern, 'x' is replaced with θ (an angle from the reference line) and 'y' is replaced with 'r' (a distance from the origin) respectively, then the first to fifth methods are just applied to them respectively. Then, each pixel position is converted to polar coordinates, so a hole edge having roughness is represented, for example, as shown in FIG. 10B. And when the data shown in FIG. 10B is obtained, it will become easy to apply the first to fifth embodiments to the object.

According to the present invention, therefore, in size (length) measurements or roughness measurements, the smoothing parameter has come to be set more easily than in any conventional methods, and thereby the accuracy of measurements is improved.

Furthermore, according to the present invention, size (length) or roughness values have come to be calculated even from images having low signal quality (signal S/N ratio is low or the number of signal integrations is small). Thus, measured values are prevented from variations that might otherwise occur due to image processings. Consequently, it is possible to obtain measured values that are closer to their true values.

Furthermore, the present invention can reduce the number of signal integrations required for improving the image quality more significantly than any conventional methods, so the beam irradiation onto samples is reduced and, accordingly, sample damages are reduced. In addition, the number of images to be obtained is also reduced, so the total measurement or inspection time is reduced, and thereby the measurement throughput is improved.

BRIEF DESCRIPTION OF THE DRAWINGS

FIG. 1A is a graph that shows a relationship between a measured pattern and a signal profile obtained from the pattern;

FIG. 1B is another graph that shows the relationship between the measured pattern and the signal profile obtained from the pattern; FIG. 1C is still another graph that shows the relationship between the measured pattern and the signal profile obtained from the pattern; FIG. 1D is a graph that shows the relationship between the measured pattern and the signal profile obtained from the pattern.

FIG. 18 is a flowchart of the procedures for processing an image in the third embodiment;

FIG. 19 is a graph showing a difference between B(Sm) and N(Sm) obtained in the third and fifth embodiments;

DETAILED DESCRIPTION OF THE PREFERRED EMBODIMENTS

First Embodiment

In this first embodiment, there will be described one of the objects of the present invention, which is related to size (length) measurements described in the section of "SUMMARY OF THE INVENTION". The method selects an Sm value that will less affect size (length) values by figuring out positions and size (length) values of edge points in cases in which the Sm value is 1 and not 1. In this embodiment, the method is applied to measurement results of a line pattern observed through an electron microscope capable of measuring lengths, that is, through a CD-SEM.

Figure 2A:
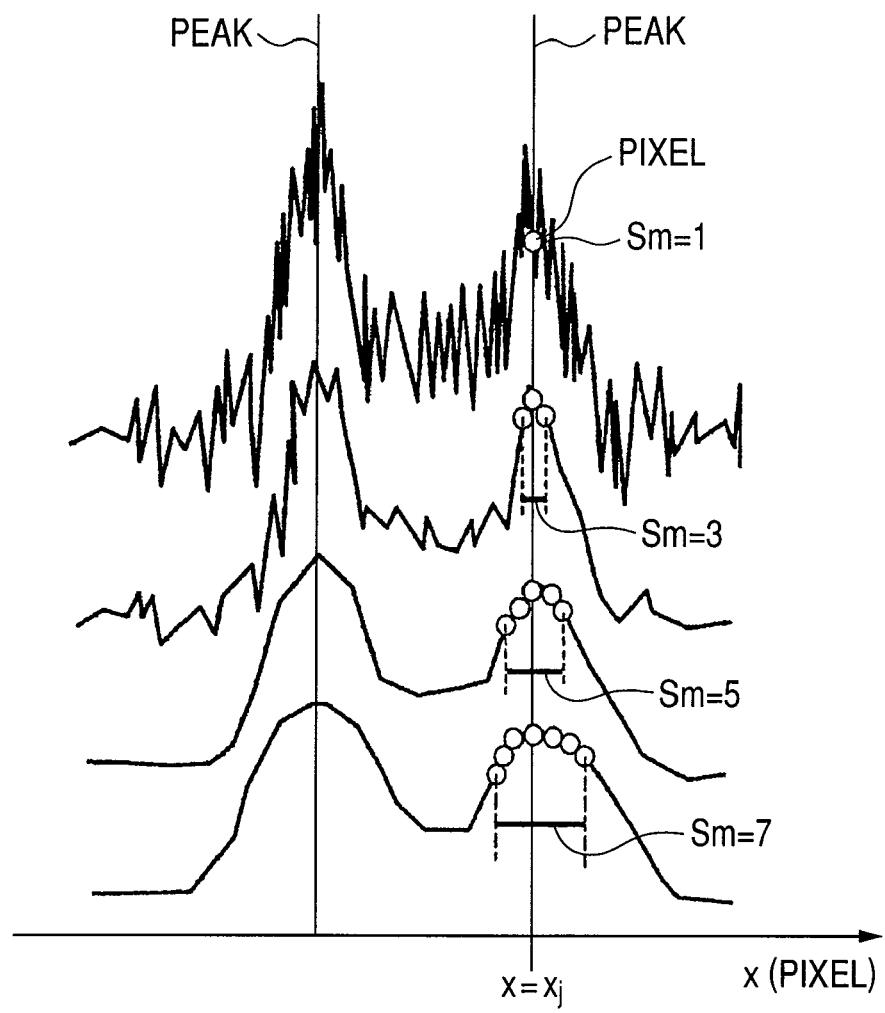
FIG. 2A is a graph that shows how a signal profile changes according to the dependence on the smoothing parameter Sm.
Figure 2B:
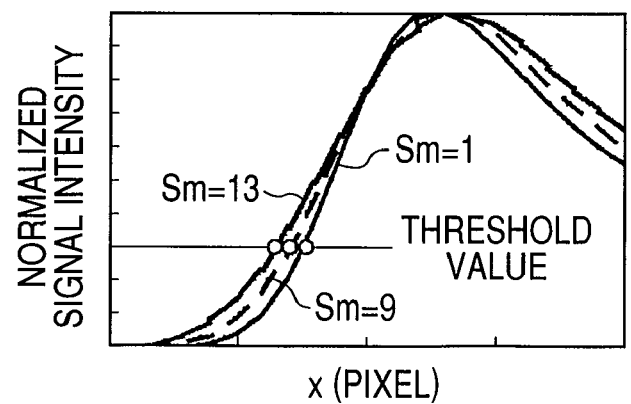
FIG. 2B is another graph that shows how the signal profile changes according to the dependence on the smoothing parameter Sm.
Figure 3A:
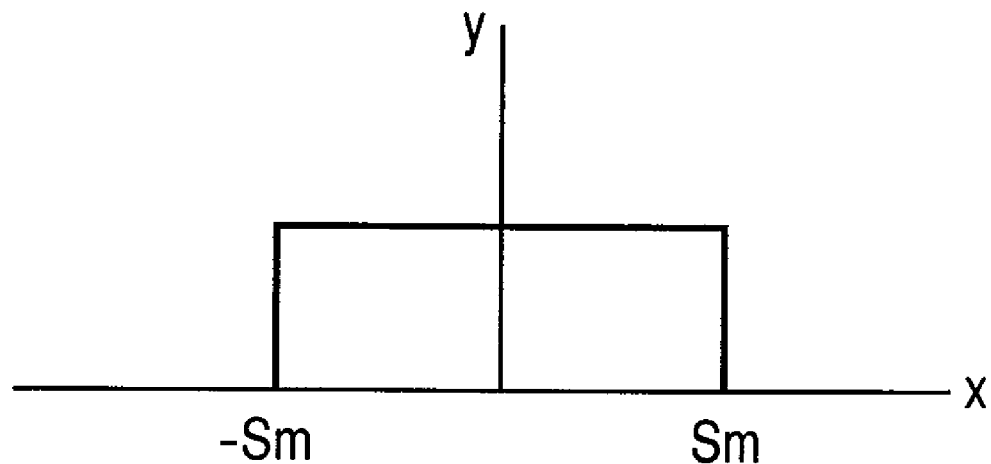
FIG. 3A is an example of a window function.
Figure 3B:
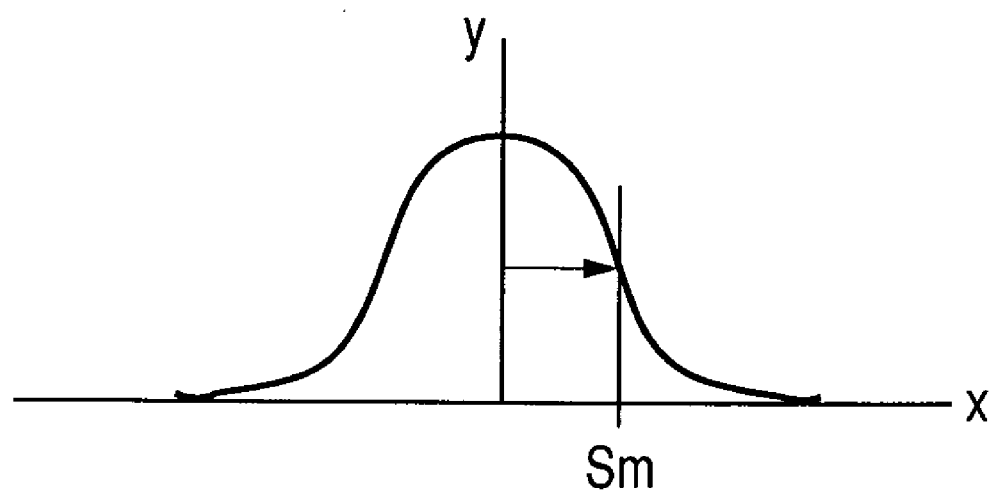
FIG. 3B is an example of a Gaussian function.
Figure 4A:
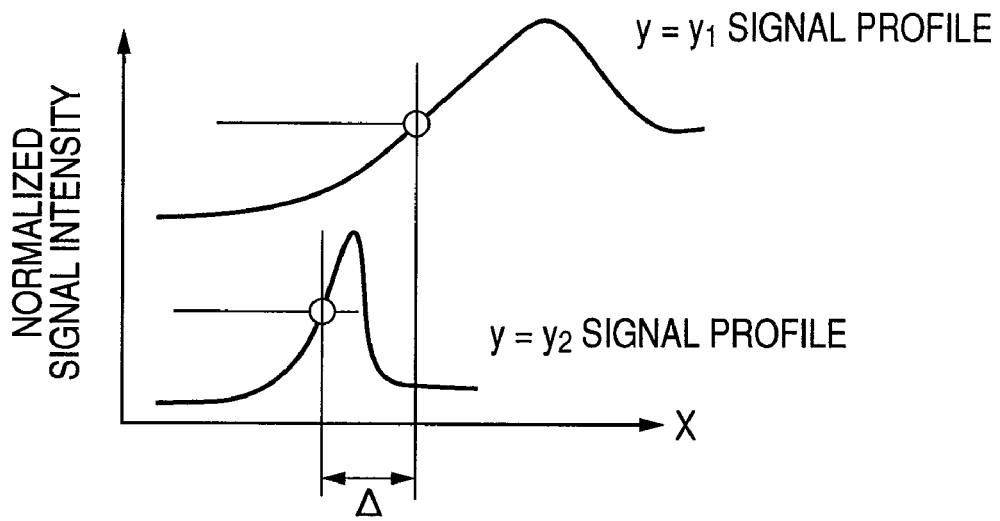
FIG. 4A is a graph that shows how an edge point is deviated by smoothing.
Figure 4B:
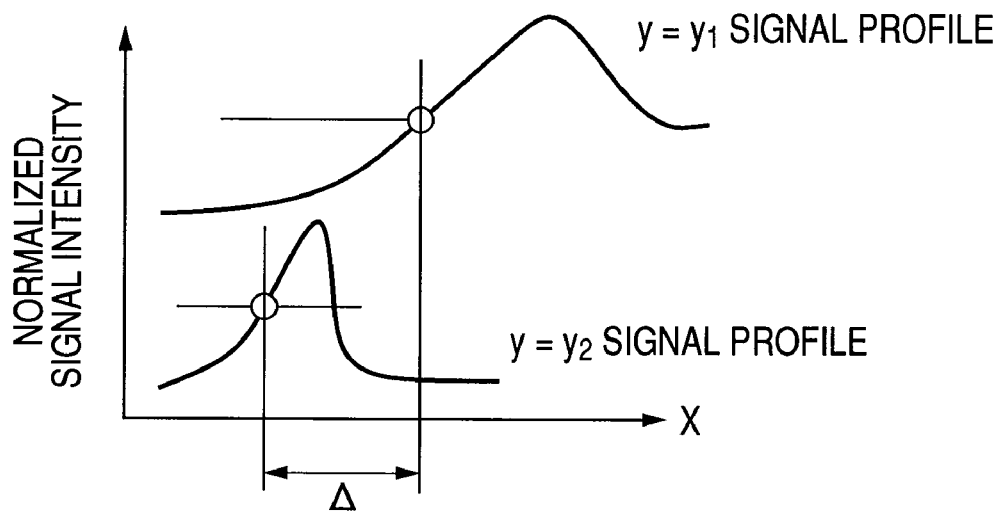
FIG. 4B is another graph that shows how the edge point is deviated by smoothing.
Figure 5A:
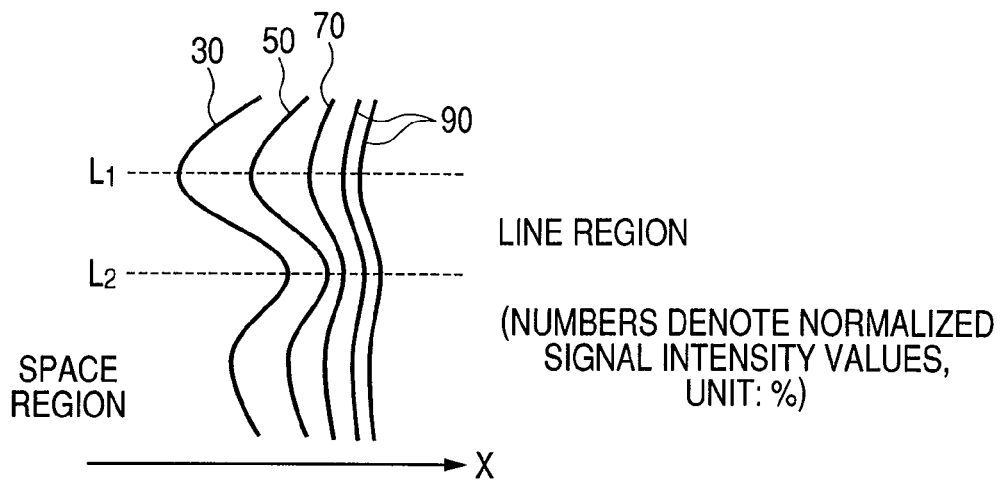
FIG. 5A is a contour chart of signal intensity to appear around a pattern edge of type A.
Figure 5B:
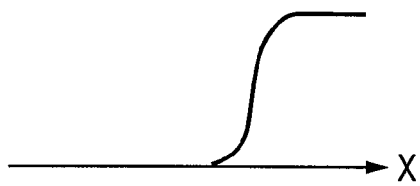
FIG. 5B is a cross-sectional view of a measured pattern.
Figure 6:
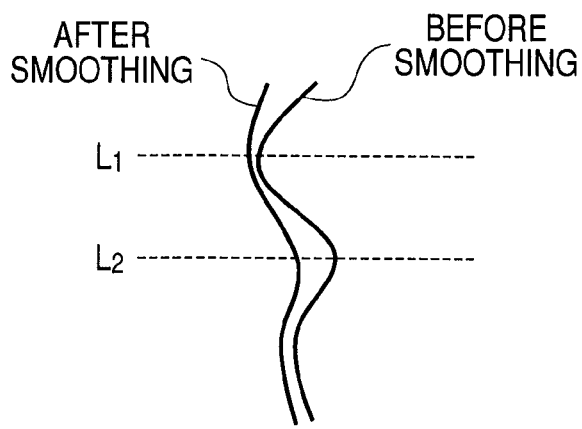
FIG. 6 is a pattern edge extracted from the contour chart shown in FIG. 5.
Figure 7A:
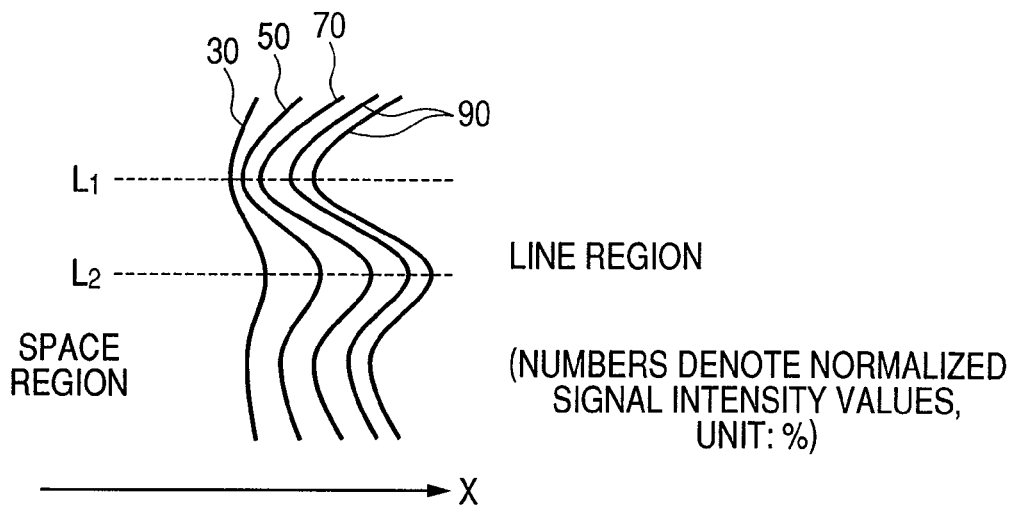
FIG. 7A is a contour chart of signal intensity to appear around a pattern edge of type B.
Figure 7B:
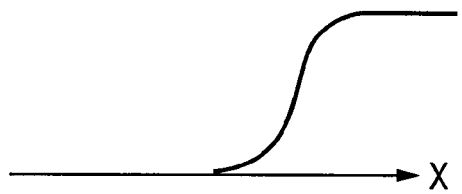
FIG. 7B is a cross-sectional view of a measured pattern.
Figure 8:
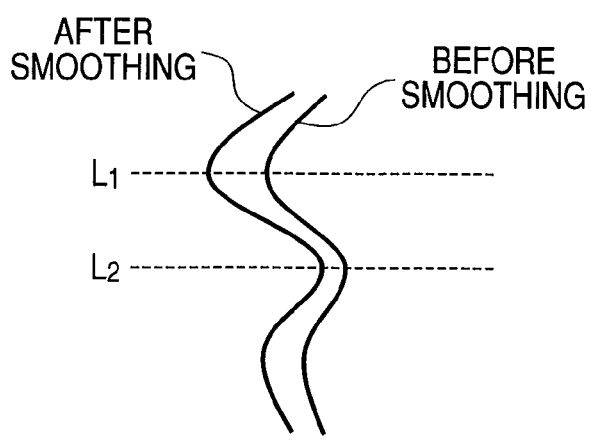
FIG. 8 is a pattern edge extracted from the contour chart shown in FIG. 7.
Figure 9:
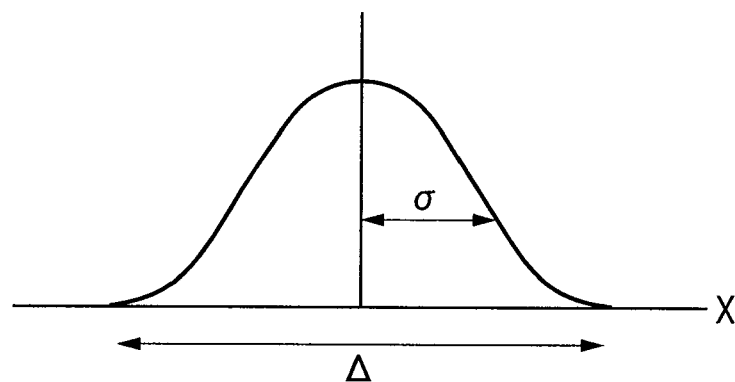
FIG. 9 is a graph that shows a relationship between σ and Δ in the distribution of edge points (x coordinates)
Figure 10A:
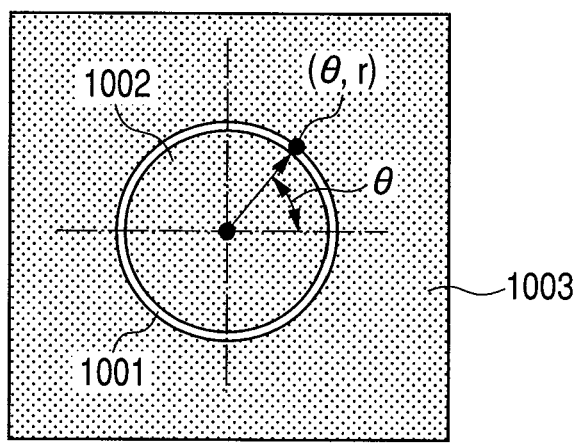
FIG. 10A is an explanatory diagram showing a CD-SEM image of a contact hole.
Figure 10B:
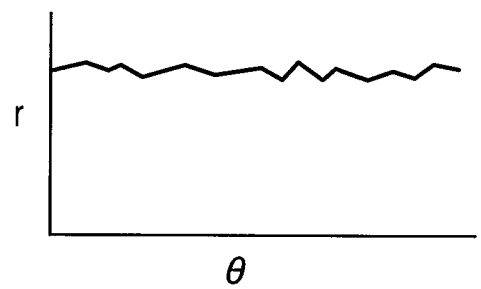
FIG. 10B is another explanatory diagram showing the CD-SEM image of the contact hole.
Figure 11:
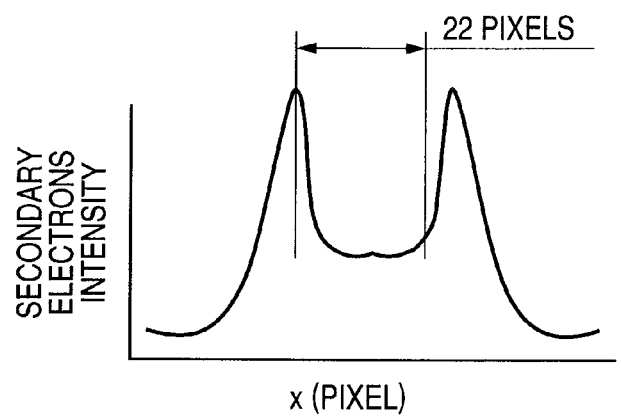
FIG. 11 is an explanatory diagram showing a typical signal profile.
Figure 12:
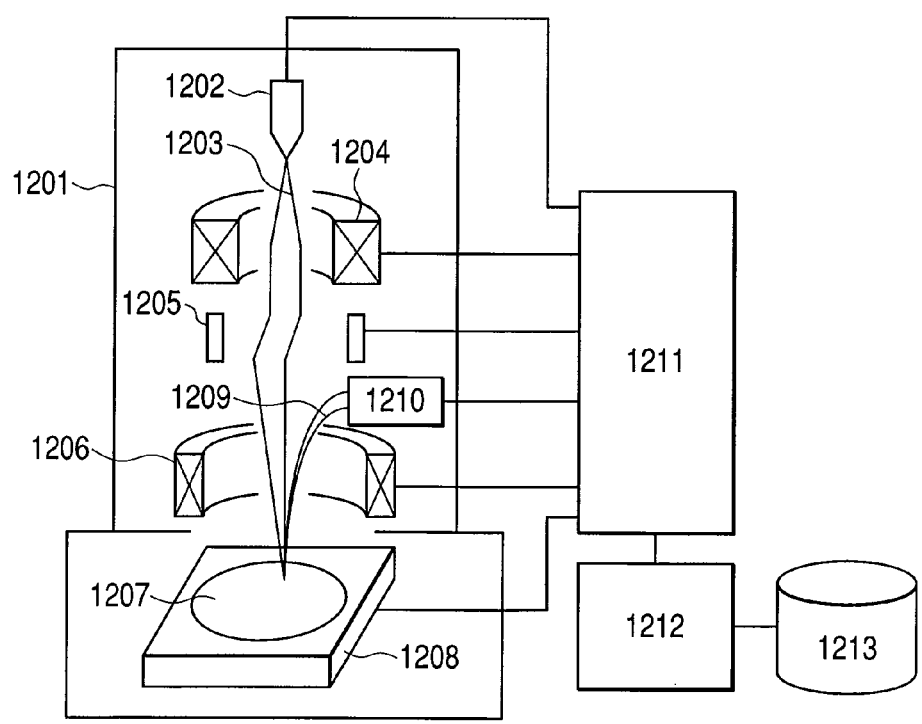
FIG. 12 is a block diagram of a configuration of a length measurement system employed in the first to fourth embodiments.
Figure 13:
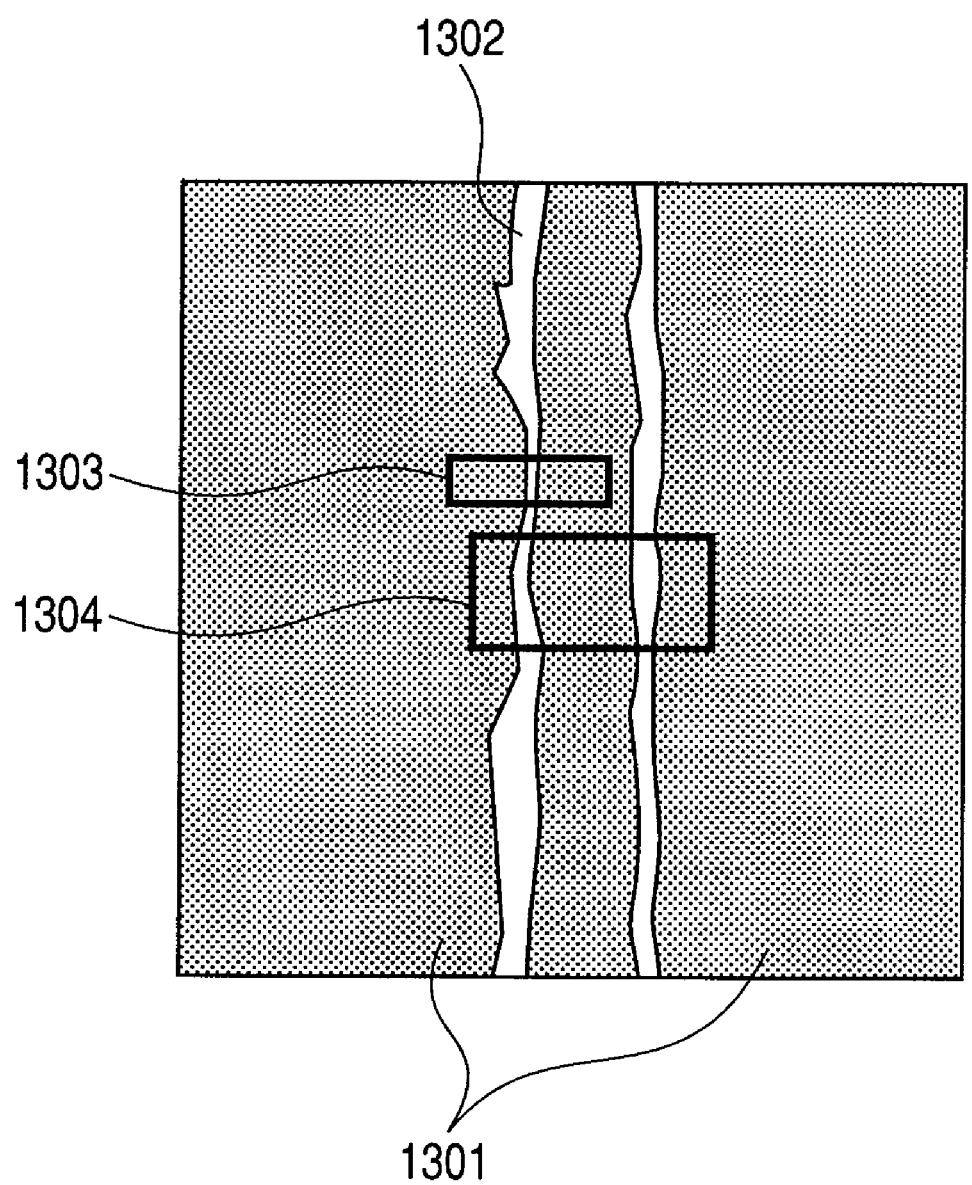
FIG. 13 is an explanatory diagram of an image obtained by the length measurement system in the first and second embodiments.
Figure 14:
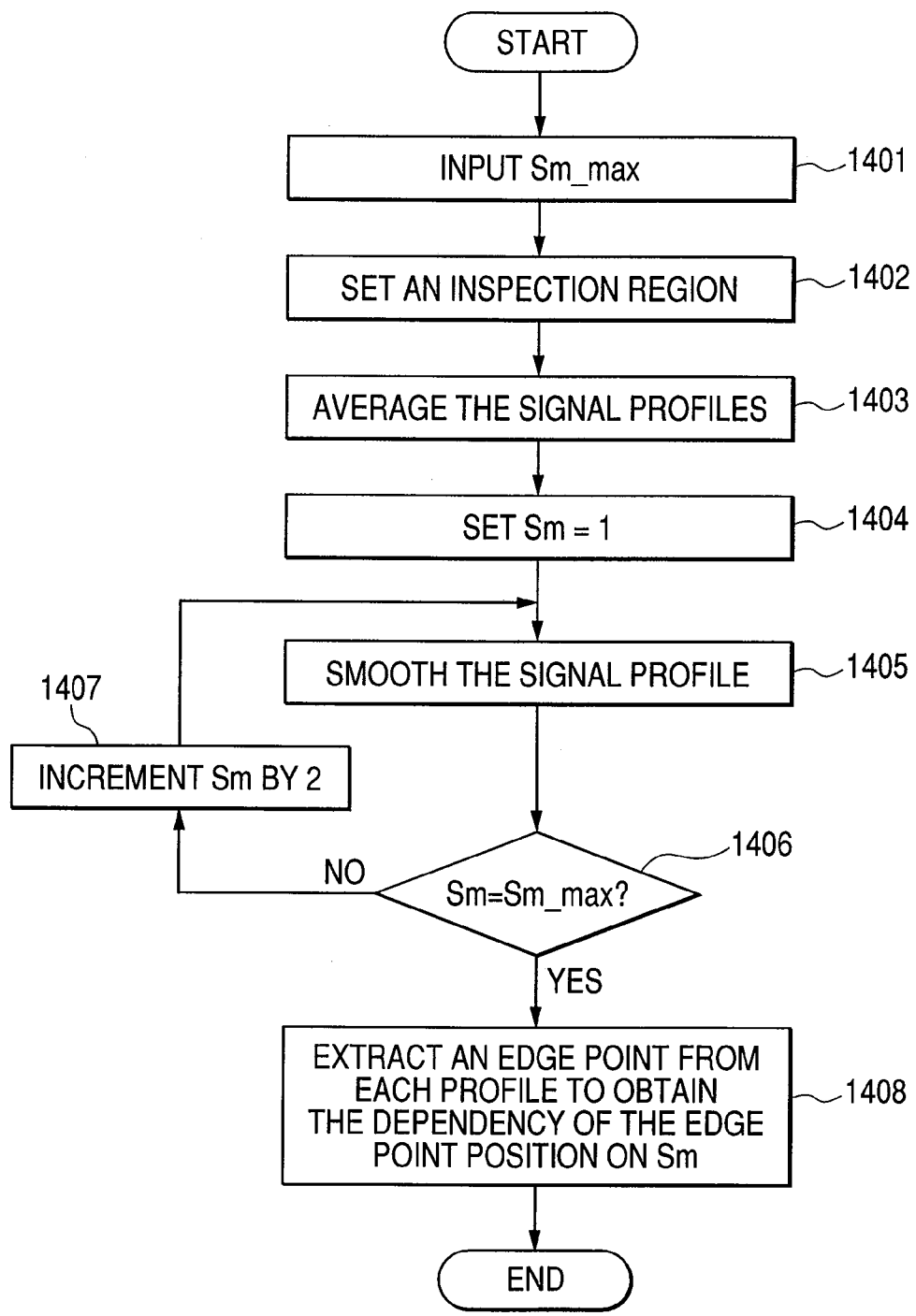
FIG. 14 is a flowchart of the processings for finding the dependency of an edge point on the smoothing parameter.
Figure 15:
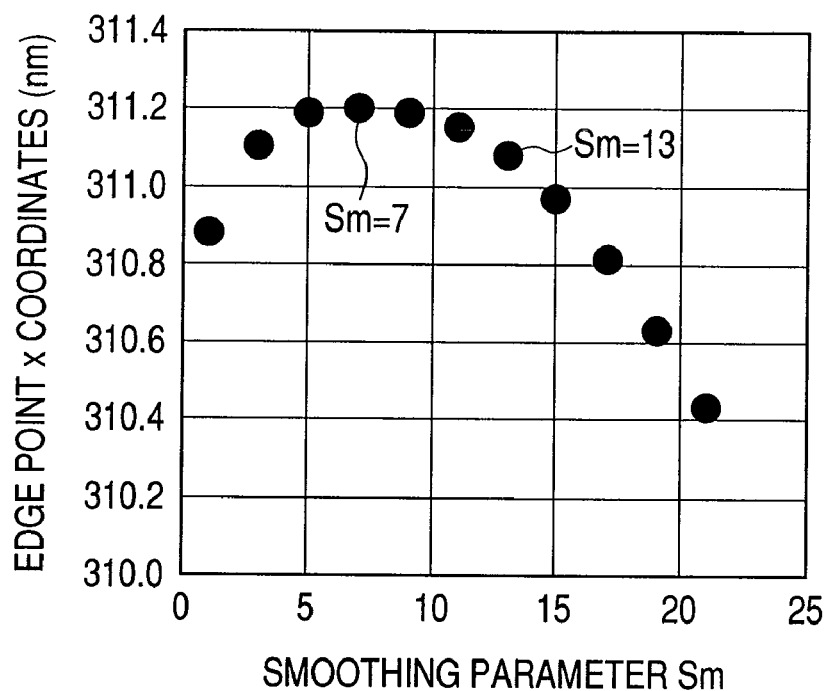
FIG. 15 is a graph showing the dependency of an edge point position obtained in the first embodiment on the smoothing parameter.

This first embodiment will be described with reference to FIGS. 11 through 15. FIG. 11 shows a typical signal profile obtained from an image through pattern observation. FIG. 12 shows an explanatory view of an employed inspection system with respect to its configuration. FIG. 13 is a CD-SEM image of a pattern analyzed in this first embodiment, that is, an explanatory view of the two-dimensional distribution data of a secondary electron signal. FIG. 14 is a flowchart of the procedures carried out for a portion used to find the dependency of an edge point (x coordinates) on the smoothing parameter (Sm). FIG. 15 is a graph representing the dependency of the edge point (x coordinates in the image) obtained in this first embodiment on the smoothing parameter (Sm).

Prior to the description of this first embodiment, it was required to set an upper limit to the value of the smoothing parameter Sm. This upper limit value was assumed as Sm_max. And in order to decide the Sm_max, the distance between the peaks of adjacent signal profiles was assumed as the standard. In this case, it was also required to make CD-SEM observation for the target pattern sample beforehand to obtain a typical signal profile. FIG. 11 shows an example of such a pattern sample signal profile. This profile is not smoothed, but averaged enough. And because this pattern is an isolated one, the profile peak nearest to the signal profile corresponding to the left edge of the pattern is assumed as the profile peak corresponding to the right edge. The distance between the left edge signal profile peak and the bottom of the signal profile peak representing the right edge was found to be about 22 pixels. And in order to protect the position of the left edge signal profile peak from the influence of the right edge signal, the Sm_max was set at 21 (the maximum odd number under 22). The Sm_max may be another number if the left edge signal profile peak position is not affected by the right edge signal.

After that, the two-dimensional intensity distribution data was obtained from the object sample with use of a length measurement system shown in FIG. 12. The system includes a scanning electron microscope body 1201 used to obtain two-dimensional intensity distribution data, a controller 1211, and a data processing computer 1212. The scanning microscope 1201 includes an electron gun 1202, a condenser lens 1204, a scanning deflector 1205, an objective lens 1206, a sample stage 1208, a detector 1210 used to detect secondary electrons generated by electron beam irradiation or reflected electrons, etc. The controller 1211 controls each component of the scanning electron microscope 1201. Signals output from the detector 1210 are processed by the computer 1212. The reference numeral 1213 denotes a data storage used to store software programs and various types of data required for the processings in the controller 1211 and in the computer 1212. Although not shown in FIG. 12, the computer 1212 is connected to an image display device and information input devices (pointing devices such as a mouse, etc., a keyboard, etc.) used to set parameters and values required for the information processings in the computer 1212.

The sample, which was deposited on a silicon wafer, had a resist line pattern of about 50 nm in width. This sample 1207 was put on the stage 1208 and an electron beam 1203 was irradiated on the sample 1207 to detect secondary electrons 1209 generated therefrom, thereby obtaining the secondary electron signal data in a predetermined region. The observation region was a 675×675 nm square. This observation region was then divided into regions of 512 pixels and the intensity of the secondary electrons in each region (pixel) was measured. An image of the secondary electron intensity distribution in this 675 nm×675 nm region was displayed on the monitor screen of the computer 1212.

FIG. 13 shows an explanatory view of the displayed image. In FIG. 13, the object line pattern was positioned in the center portion. The reference numeral 1301 denotes a region where the surface of the wafer is exposed at both sides of the resist. The band-like region 1302 (white band) is equivalent to a region around the left side edge of the line pattern. The band region at the right side of the white band 1302 is a white band corresponding to the right edge of the line.

FIG. 14 shows a flowchart of the processings carried out for the two-dimensional intensity distribution data of the image shown in FIG. 13. Hereinafter, there will be described a calculation method employed in this first embodiment with reference to FIG. 14. The various types of arithmetic processings to be described below are all executed by the computer 1212.

At first, the Sm_max value is set. The Sm_max value may be inputted by the operator of the system shown in FIG. 12 or the system may calculate the value automatically through the line pattern signal profile analysis. The Sm_max value is set in step 1401.

After that, an inspection region was set to search an edge point existing at the narrowest portion of the band region 1302 of the displayed image shown in FIG. 13. The reference numeral 1303 denotes the set inspection region. This means that the edge point having the narrowest white band width is searched in the region 1303. The reason why the inspection region is set in such a portion having the narrowest band width is that the narrower the profile width is, the more the profile is affected by the smoothing process. This step is equivalent to that 1402.

Then, control went to step 1403 to select and average signal profiles included in the secondary electrons intensity distribution shown in FIG. 13 and having y coordinates existing within the inspection region 1303.

In step 1404, the smoothing parameter Sm value is initialized, thereby the Sm value becomes Sm=1.

In step 1405, the average signal profile obtained in step 1402 was smoothed according to the set smoothing parameter Sm.

After that, control went to step 1406 to check the Sm value used in the smoothing process in step 1405 to decide whether or not the value has reached the maximum value Sm_max. If not reached, control went to step 1407 to add "2" to the Sm value, then control went to step 1405. If the maximum value had reached Sm_max, control went to 1408.

In step 1408, an edge point was calculated from the obtained smoothed signal profile and the dependency of the signal profile on the Sm value was output, then the processing was terminated.

The processing in step 1408 for figuring out an edge point can also be carried out in step 1405 for smoothing. In the case of the flowchart shown in FIG. 14, the shape of the signal profile is required to be held in a memory, but if the edge point can be calculated in step 1405, only the edge point position can be held in the memory. Thus, the memory capacity of the evaluation system is saved.

FIG. 15 shows a graph denoting the dependency of the position of an edge point on the Sm value. The optimal Sm value is decided with use of this graph in FIG. 15. The graph includes a range in which the Sm value is stable (a range in which the Sm value is within 5 to 9). In the case of Sm=1, the edge point is deviated significantly outward from the line. This tendency is also seen in the case of Sm=3. The present inventor thought that this was caused by the noise from a space region (1301). In the range where the Sm value is stable, the influence by such a noise is comparatively suppressed. If the Sm value becomes 11 or over, the edge point begins the outward deviation again. However, this is because the original shape of the signal profile is largely destroyed by the smoothing. Therefore, by taking into consideration the tendency of the plotting in FIG. 15, the Sm value is decided as "7", which denotes the center of the stable region.

In the above case, Sm=7 was enough to obtain favorable reproducibility of edge points. If the evaluation system is installed in bad environmental conditions and accordingly it is required to increase the Sm value so as to reduce the noise, however, the Sm value should be set as follows. At first, an allowable error is set for the size (length) measurement. In this case, the allowable error was 0.4 nm. And when the Sm value is increased, the edge point is shifted outward, so the line size increases. If the increment value is assumed to be 0.4 nm or under, the increase of the line size can be allowed up to 0.2 nm at the left side edge. Thus, the maximum Sm value was searched under the condition that the deviation of the edge point from the edge point in the stable region was 0.2 nm or under. And as to be understood in FIG. 15, the maximum Sm value was 13. If an attempt was made to minimize the noise influence by taking into consideration the allowable size error, it was decided that the maximum Sm value could be 13.

The Sm value selection as described above can also be made automatically. As described above, Sm=7 was obtained in accordance with the graph shape shown in FIG. 15. If the solution is obtained automatically, it is required to search a region where the dependency of the edge point position on the Sm value becomes flat, then to execute a program that can output the Sm value of the center of the portion. When outputting the maximum Sm value, it is required to input the size allowable error, then execute a program that can output the maximum Sm value on a condition that the deviation of the edge point position becomes a half or under.

In any of the methods described above, the size (length) measurement came to be possible without causing the degradation of the measurement accuracy that might otherwise occur due to the excessive noise reduction. Furthermore, it has also been possible to use size (length) values of which measurement accuracy is higher than any conventional one as parameters for monitoring the control of the fabrication processes of semiconductor devices. Therefore, the measurement yield of semiconductor devices was improved.

While descriptions have been made for a configuration example of a scanning type electron microscope (CD-SEM) capable of measuring lengths as a typical micropattern shape evaluation system, the present invention in this embodiment can also apply to measurement results of other microscopes. Furthermore, the present invention in this embodiment can also apply not only to the line and space patterns, but also, of course, to more complicated shape patterns such as contact hole patterns, OPC patterns, etc.

Second Embodiment

In this second embodiment, there will be described another one of the objects of the present invention described in the section "SUMMARY OF THE INVENTION". The object relates to a method that estimates a size (length) value at Sm=1, that is, a size (length) value that might be obtained without smoothing by fitting the dependency of a size (length) value on the Sm value with a function. In this embodiment, the method is applied to line pattern measurement results obtained by using an electron microscope capable of measuring lengths, that is, by using a CD-SEM.

Figure 16:
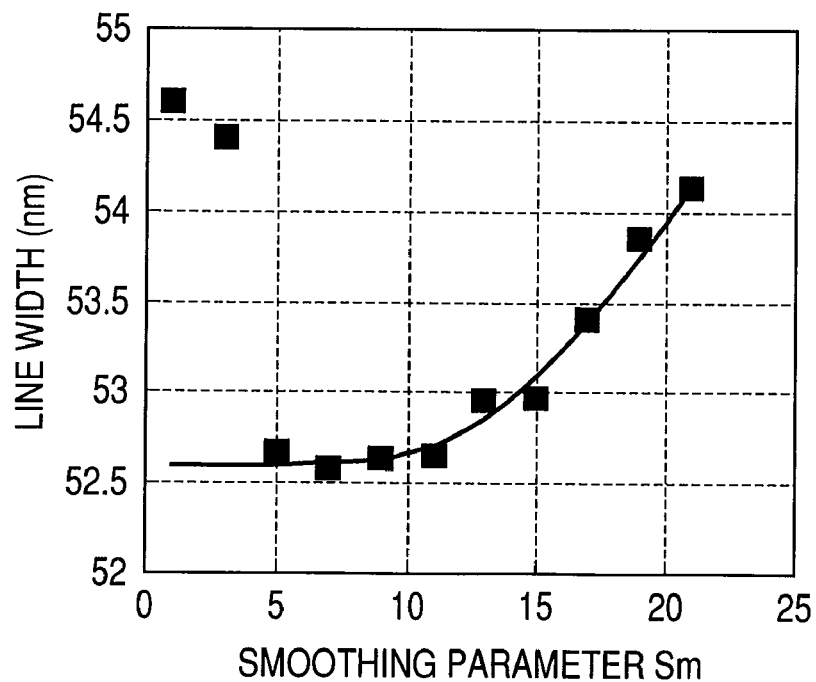
FIG. 16 is a graph showing the dependency of a line width obtained in the second embodiment on the smoothing parameter.

This second embodiment will be described with reference to FIGS. 12, 13, and 16. FIG. 12 shows an explanatory view of a configuration of an employed inspection system. FIG. 13 shows an explanatory view of two-dimensional distribution data of a CD-SEM image of a pattern analyzed in this second embodiment, that is, that of a secondary electron signal, as well as a processing region defined on the image. FIG. 16 shows a graph denoting the dependency of the line width on the smoothing parameter.

In this second embodiment, the sample is the same as that used in the first embodiment. Consequently, the procedures for obtaining the secondary electron intensity distribution data shown in FIG. 13 are also the same as those in the first embodiment. The configuration of the inspection system is as shown in FIG. 12; the description of the details is omitted here. The maximum Sm value to be inspected in this embodiment was set at 21 just like in the first embodiment.

Hereunder, there will be described a calculation method employed in this embodiment with reference to the flowchart shown in FIG. 14. The various arithmetic processings to be described below are all executed by the computer 1212.

At first, an inspection region 1304 was set on the monitor screen. Then, just like in the first embodiment, signal profiles having y coordinates existing within the y coordinates of the inspection region 1304 were selected from the signal profiles in the secondary electron intensity distribution shown in FIG. 13, then the selected signal profiles were averaged.

After that, just like in the first embodiment, the Sm value was varied sequentially from 1 to 21 for the obtained average signal profile, which is then subjected to smoothing to obtain 11 profiles (corresponding to Sm=1, 3, 5, ..., 21). Then, right and left edge points were detected from the profile peaks corresponding to the right and left edges with respect to the 11 profiles. After that, the difference, that is, the line width was obtained. FIG. 16 shows the dependency of the line width on the Sm value with black squares.

In this embodiment, the following is used as a fitting function.

$$y=a_1+a_2\exp(-a_3/(x-1)) \qquad \text{(Equation 20)}$$

Here, "y" denotes a line width and "x" denotes an Sm value. The $a_1$, $a_2$, and $a_3$ in the equation are all fitting parameters.

After that, fitting was carried out for the object to find a curve most suitable for the dependency data (black squares in FIG. 16). At this time, the size (length) values at Sm=1 and Sm=3 are abnormally larger than other values. This was decided clearly to be failure of extraction of edge points due to the noise influence. These size (length) values were thus excluded from the fitting. In other words, the results of which Sm values are 5 or over were subjected to the fitting. In FIG. 16, a solid line denotes the obtained fitting curve. At this time, the $a_1$ value became 52.6. Consequently, it was found that the pattern size became 52.6 nm unless otherwise the signal profile was broadened through smoothing.

This method has thus enabled the size (length) measurement in this embodiment to obtain values closer to the true ones than any conventional techniques. As a result, the measurement yield was improved.

While descriptions have been made for a configuration example of a scanning type electron microscope (CD-SEM) capable of measuring lengths as a typical micropattern shape evaluation system, the present invention in this embodiment can also apply to measurement results of other microscopes. Furthermore, the present invention in this embodiment can also apply not only to the line and space patterns, but also, of course, to more complicated shape patterns such as contact hole patterns, OPC patterns, etc.

Third Embodiment

In this third embodiment, there will be described still another one of the objects of the present invention, which is related to the roughness measurement described in the section of "SUMMARY OF THE INVENTION". The object is a measurement method applied to line pattern measurement results obtained by using an electron microscope capable of measuring lengths, that is, by using a CD-SEM. According to the method, at first, the widest region and the narrowest region that appear like bands on an image that is equivalent to pattern edges are selected, then the dependencies B(Sm) and N(Sm) of each edge point position on the Sm value are calculated with respect to each of those widest and narrowest band-like regions. Then, according to the result, a difference between those calculated Sm values is calculated to select an object Sm value.

Figure 17:
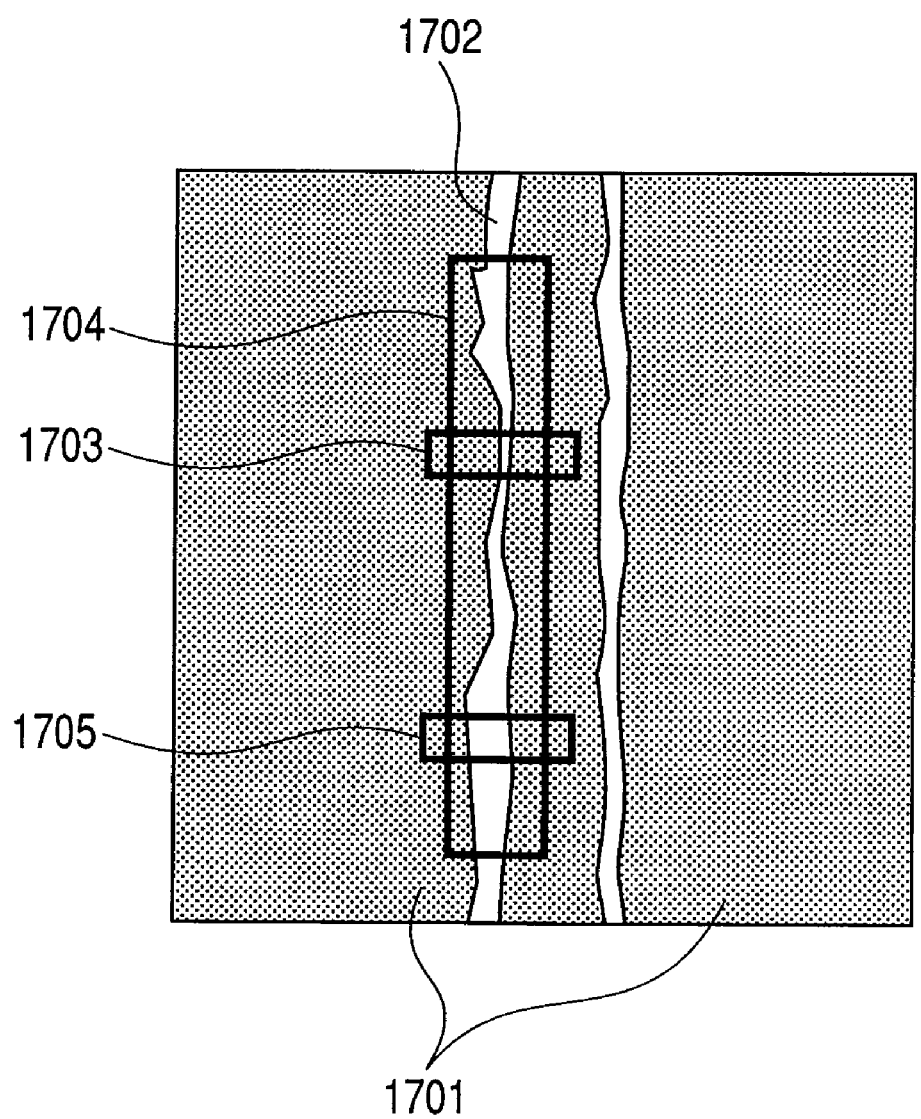
FIG. 17 is an explanatory diagram of an image obtained by a length measurement employed in the third to sixth embodiments.

This third embodiment will be described with reference to FIGS. 12, 17, 18, and 19. FIG. 12 shows an explanatory view of a configuration of an employed inspection system. FIG. 17 shows a CD-SEM image of a pattern analyzed in this third embodiment, that is, an explanatory view of two-dimensional distribution data of a secondary electron signal and a processing region determined on the image. FIG. 18 shows a flowchart of the procedures for processing an image after obtaining secondary electron intensity distribution data in this third embodiment. FIG. 19 shows a difference between the functions B(Sm) and N(Sm) obtained in this embodiment.

The secondary electron intensity distribution data to be measured in this third embodiment is the same as that in the first embodiment. The procedures for obtaining the image data shown in FIG. 17 are also the same as those in the first embodiment. And the signal profiles shown in FIG. 17 are the same as those shown in FIG. 13. The configuration of the inspection system is as explained below. The details of the configuration are already described in the first embodiment, so the description will be omitted here. The maximum Sm value Sm_max is also set just like in the first embodiment. In this embodiment, evaluations are made for the roughness of the left edge of the line pattern shown in FIG. 17.

Hereunder, there will be described a calculation method employed in this embodiment with reference to the flowchart shown in FIG. 18. The various types of arithmetic processings to be described below are all executed by the computer 1212.

At first, the secondary electron intensity distribution shown in FIG. 17 is displayed on the monitor screen as an analysis object image.

Then, in step 1801, the operator selected the narrowest and widest regions from among the band-like regions representing the neighborhood of an edge, then specified those regions as inspection regions. The specified inspection regions were 1703 and 1705.

After that, signal profiles having y coordinates within the range of the y coordinates of the inspection region 1703 were selected from among the signal profiles of the secondary electrons intensity distribution shown in FIG. 17 and those regions were averaged (step 1802). The obtained profile was of the narrowest band region. Then, signal profiles having y coordinates within the range of the y coordinates of the inspection region 1705 were also selected and averaged (step 1803). The obtained profile was of the widest band region. These two steps 1802 and 1803 may be reversed in order.

After that, control went to step 1804 to set the Sm values to be varied from 1 to 21 sequentially just like in the first embodiment with respect to the two averaged profiles, then those profiles are smoothed. Then, edge point positions were detected with respect to 11 profiles having different Sm values (corresponding to Sm=1, 3, 5, . . . , 21). This edge point detection was made for each of the narrowest and widest band regions. The processing in this step is equivalent to a process in which the processings in steps 1403 to 1408 shown in FIG. 14 in the second embodiment were carried out for each data of the above two regions. The dependency of each edge point position obtained from the signal profile of the narrowest band region on the Sm value was defined as N(Sm) and that of the widest band region was defined as B(Sm).

In the next step 1805, B(Sm)–N(Sm) was calculated and output. FIG. 19 shows the dependency of the calculated B(Sm)–N(Sm) on the Sm value. The dependency of the B(Sm)–N(Sm) on the Sm value has clarified that the distance between edge points remains the same if the smoothing parameter Sm value is 7 or under. When figuring out the roughness, therefore, the proper Sm value was decided as 7. This method has made it possible to carry out roughness measurements to obtain each size closer to its real one than any conventional techniques.

Although the operator selected the narrowest and widest band regions in this embodiment, the selection may also be done automatically after searching the object image.

Although descriptions have been made for a configuration example of a scanning type electron microscope (CD-SEM) capable of measuring lengths as a typical example of a micropattern shape evaluation system, the present invention can also apply to the measurement results obtained by using any microscopes other than the CD-SEM. Furthermore, the present invention can also apply not only to the line and space patterns, but also, of course, to more complicated shape patterns such as contact hole patterns, OPC patterns, etc.

Fourth Embodiment

In this embodiment, there will be described still another object of the present invention related to the roughness measurement described in the section "SUMMARY OF THE INVENTION". This object relates to an example of a method that selects an Sm value from the dependency R(Sm) of roughness on the Sm value applied to the line pattern measurement results obtained by using an electron microscope capable of measuring lengths, that is, by using a CD-SEM.

Figure 20:
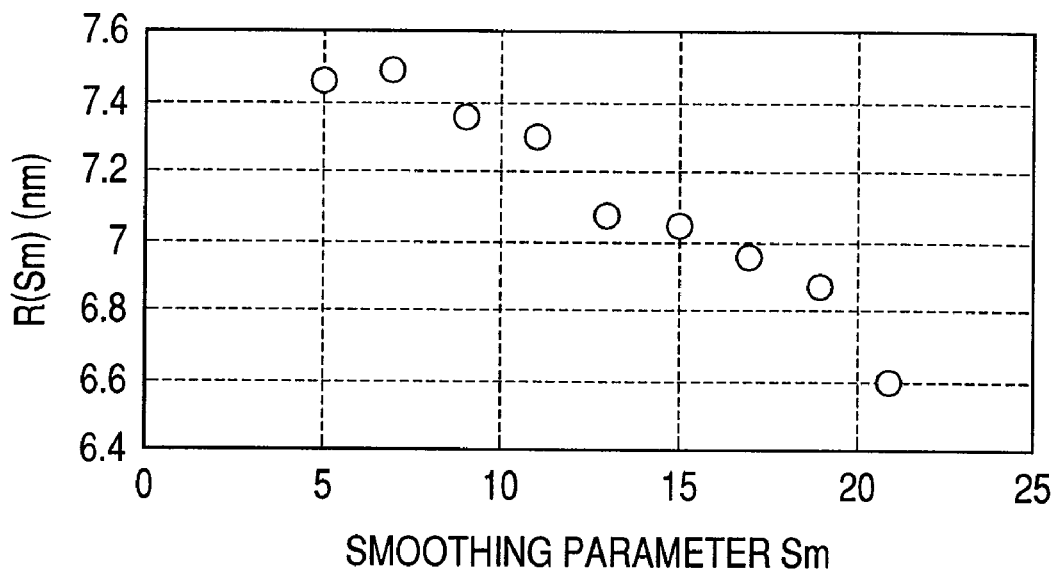
FIG. 20 is a graph showing the dependency of the roughness obtained in the fourth and fifth embodiments on the smoothing parameter.

This fourth embodiment will be described with reference to FIGS. 12, 17, and 20. FIG. 12 shows an explanatory view of a configuration of an employed inspection system. FIG. 17 shows a CD-SEM image of a pattern analyzed in this third embodiment, that is, an explanatory view of two-dimensional distribution data of a secondary electron signal and a processing region determined on the image. FIG. 20 shows a graph showing the dependency of the roughness on the Sm value, obtained in this fourth embodiment.

The object secondary electrons intensity distribution data used in this fourth embodiment is the same as that in the first embodiment. Consequently, the procedures for obtaining the image data as shown in FIG. 17 are the same as those in the first embodiment. The secondary electrons intensity distribution shown in FIG. 17 is also the same as that shown in FIG. 13. The configuration of the inspection system is as shown in FIG. 12. The data of the two-dimensional distribution is obtained with the output signal from the detector 1210 shown in FIG. 12. The object maximum Sm value Sm_max is also set at 21 just like in the first embodiment. In this fourth embodiment, evaluations were made for the roughness of the left edge of the line pattern shown in FIG. 17. The various types of arithmetic processings to be described below are all executed by the computer 1212.

At first, the secondary electrons intensity distribution is displayed on the monitor screen shown in FIG. 17 as an object image to be analyzed.

After that, an object region was specified on the monitor screen to calculate its roughness. The region was 1704 shown in FIG. 17. The Sm values from 1 to 21 were set sequentially for the signal in this region, then the results were smoothed. Then, the noise influence eliminated edge roughness (three times the standard deviation of the edge point in x direction distribution) was calculated for the signal intensity data of this region after smoothing. The method that calculated the noise influence eliminated edge roughness was the same as the method that found an amount of bias from the dependency of the roughness averaging parameter (an amount of blur in the longitudinal direction of the line pattern), then the amount of bias was eliminated from the measured values of roughness. The calculated roughness is assumed as a function of the Sm value. This is described as R(Sm) and the result is displayed as shown in FIG. 20. When the Sm value was 1 and 3, the noise influence was too large to calculate the roughness.

It would be understood from the dependency of the R(Sm) on the Sm value shown in FIG. 20 that the R(Sm) value is reduced in the region of which Sm is 9 or over more than in the region of which Sm is 5 or 7. This is because when the smoothing parameter is 9 or over, the smoothing lowers the roughness beyond its true value (roughness from which the image processing influence is eliminated). Here, the optimal value of the smoothing parameter was decided as "7" after analyzing the dependency of the R(Sm) on the Sm according to the standard that the smoothing parameter takes the maximum value within a range of the Sm at which the R(Sm) variation is fit within a predetermined range. Hereunder, the roughness was measured at Sm="7". Consequently, the roughness measurement became more accurate, thereby the measurement yield was improved.

In this embodiment, the same conditions were employed for both image observation and roughness inspection. And the same effects can be obtained with a method that uses such images that requires a large number of signal integrations and is hardly affected by noise only for the analysis to determine a smoothing parameter as described above and outputs the R(Sm) without using any means to remove noise influence as disclosed in the Proceedings of SPIE, Vol. 5752, pages 480 to 488 or JP-A No. 2006-215020.

Fifth Embodiment

In this fifth embodiment, there will be described still another object of the present invention with respect to the roughness measurement described in the section "SUMMARY OF THE INVENTION". The object of the present invention is an example in which the method estimates a roughness value at Sm=1, that is, a roughness value that might be obtained without smoothing by figuring out the dependency R(Sm) of roughness on the Sm value and fitting a set of data (Sm, R(Sm)) with $y=p(B(x)-N(x))+r$. The method is applied to the results of line pattern measurements obtained by using an electron microscope capable of measuring lengths, that is, by using a CD-SEM.

In this embodiment, instead of an on-line process that processes and observes object samples while observing with use of an observation device, an off-line process is employed. In the case of the off-line process, a sample image is obtained with an observation device and the image is stored in a recording device, then the image is loaded into a memory of a processor to process the image. However, the processings carried out in this embodiment can also be carried out in the on-line process.

Figure 21:
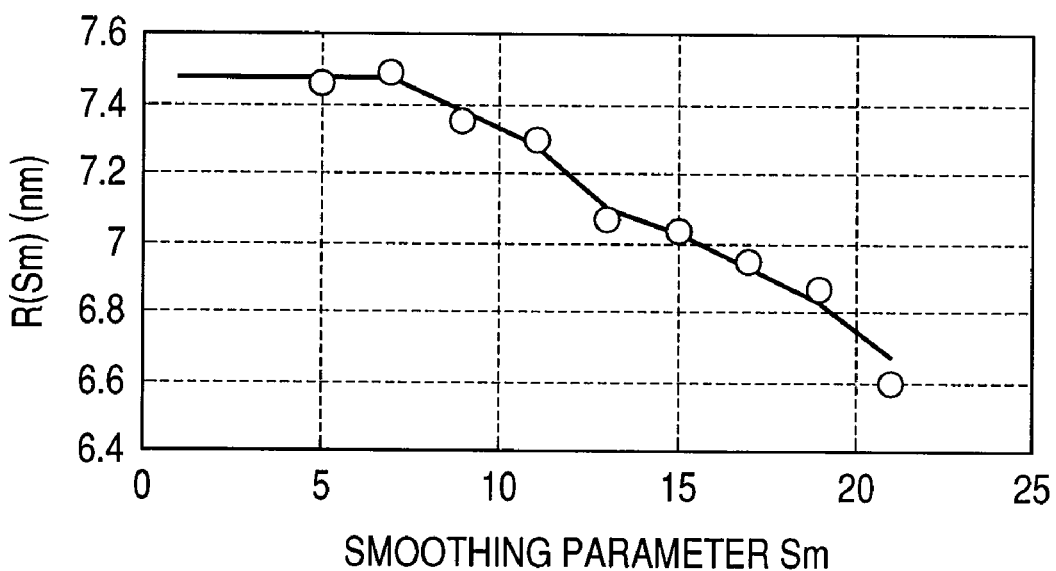
FIG. 21 is a graph showing the dependency data of the roughness obtained in the fifth embodiment on the smoothing parameter and a fitting curve with respect to the dependency data.
Figure 22:
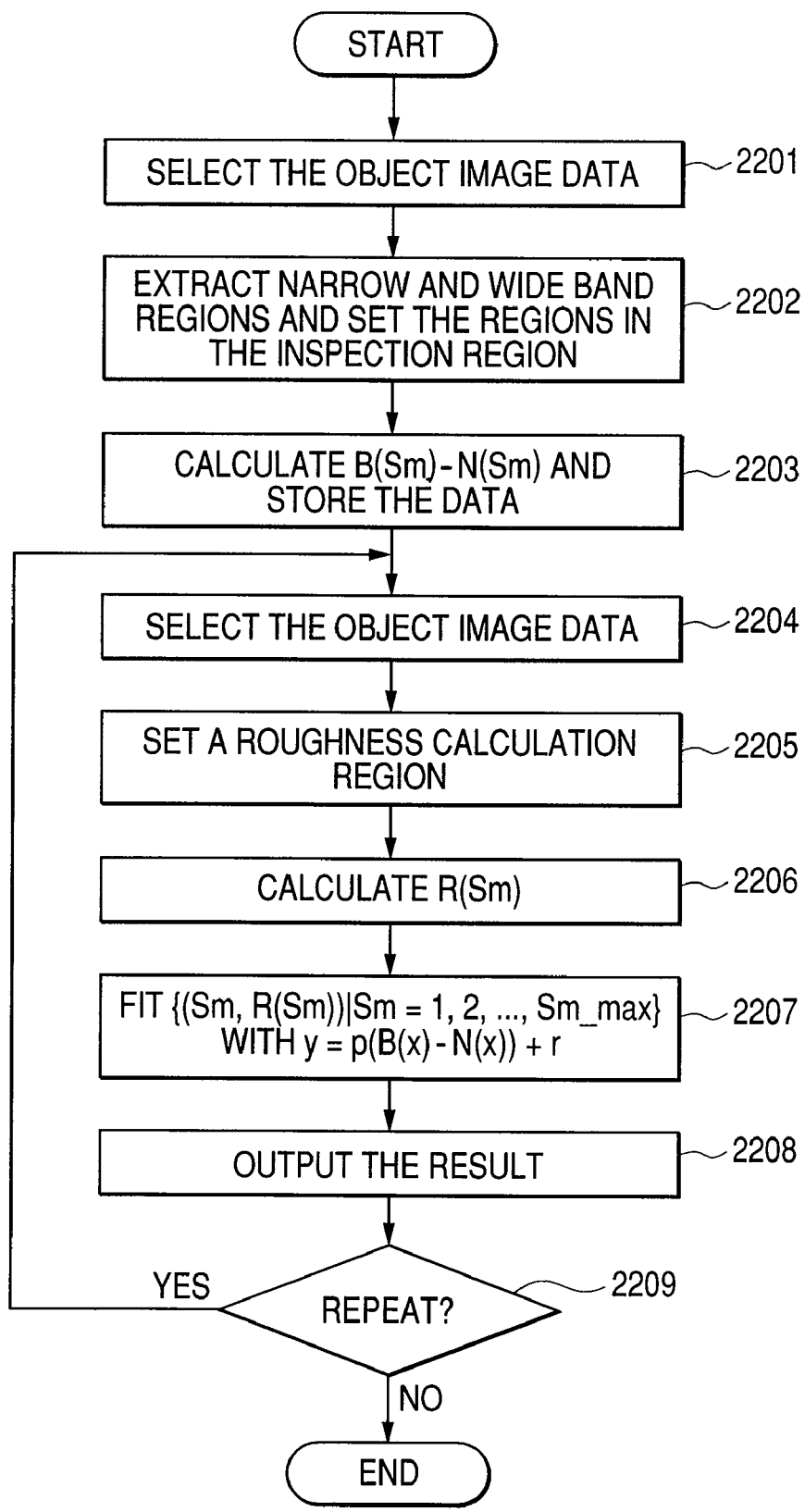
FIG. 22 is a flowchart of the processings in the fifth embodiment.

This fifth embodiment will be described with reference to FIGS. 17, 19, and 20 through 22. FIG. 17 shows a CD-SEM image of a pattern analyzed in this third embodiment, that is, an explanatory view of two-dimensional distribution data of a secondary electron signal and a processing region determined on the image. FIG. 19 shows a difference between the functions B(Sm) and N(Sm) used in this embodiment. FIG. 20 shows a graph showing the dependency of roughness on the Sm value, obtained in this fifth embodiment. FIG. 21 shows a graph describing results of fitting applied to the data shown in FIG. 20 with use of such functions as B(Sm) and N(Sm) shown in FIG. 19. FIG. 22 shows a flowchart of the procedures carried out to achieve the object of this embodiment. The image used in this embodiment is the same as that used in the first to fourth embodiments.

Hereunder, there will be described details of a measurement method in this embodiment with reference to the flowchart shown in FIG. 22. The arithmetic processings to be described below are all executed by the computer 1212.

At first, object image data was selected in step 2201 to obtain a fitting function, then the selected image data was read from the data storage 1213. The read image data was displayed on the monitor screen. In step 2202, wide and narrow band regions were specified in the image. How to select the image and the region are the same as that described in the third embodiment, so the description will be omitted here. The wide and narrow band regions were 1703 and 1705.

Then, in step 2203, B(Sm)–N(Sm) was calculated from the data of the secondary electrons intensity distribution of the regions 1703 and 1705 according to the procedure shown in the third embodiment and the result was stored in the memory. FIG. 19 is a graph showing the result of the plotting for the obtained B(Sm)–N(Sm) with respect to the Sm value.

Then, in step 2204, an object image was selected to calculate the roughness. The same image was selected here. After that, control went to step 2205 to set a region on the image so as to calculate its roughness. The region was 1704, which was the same as that used in the fourth embodiment. Then, in step 2206, the data in this region was processed in the same procedures employed in the fourth embodiment to calculate noise influence eliminated roughness R(Sm) with respect to the Sm value varied sequentially from 1 to 21. FIG. 20 is a graph showing the dependency of the calculated roughness on the SM value. In FIG. 20, the noise influence could not be eliminated completely at SM=1 and 3, so the roughness measurement was impossible.

Then, control went to step 2207 to apply fitting for the data obtained in step 2206. At this time, the data was regarded as $y=R(x)$. The least squares method was used for the fitting.

After that, in step 2208, the fitting parameter values decided to be proper for the sample were displayed on the monitor screen. The parameter values were p=0.50 and r=7.48 nm. After the fitting, the measurement result showed that the real roughness value to be obtained without smoothing was 7.48 nm. In FIG. 21, each circle denotes data used for the fitting and the solid line denotes a fitting curve obtained with the least squares method.

Then, control went to step 2209 to check the same B(Sm)–N(Sm) to decide whether to calculate the real roughness. If the check result was "NO", the processing was terminated. If the check result was "YES", control returned to step 2204 to select an object image used to calculate the roughness.

The method employed in this embodiment was effective to calculate the real roughness easily after eliminating the image processing influence therefrom, thereby the measurement yield was improved. Although descriptions have been made for a configuration of a scanning type electron microscope (CD-SEM) capable of measuring lengths as a typical example of a micropattern shape evaluation system, the present invention can also apply to the measurement results obtained by using any microscopes other than the CD-SEM. Furthermore, the present invention can apply not only to the line and space patterns, but also, of course, to more complicated shape patterns such as contact hole patterns, OPC patterns, etc.

Sixth Embodiment

In this sixth embodiment, there will be described still another object of the present invention with respect to the roughness measurement described in the section "SUMMARY OF THE INVENTION". The object of the present invention is an example in which a method that estimates a roughness value at Sm=1, that is, a roughness value that might be obtained without smoothing by figuring out the dependency R(Sm) of roughness on the Sm value and by fitting a set of data (Sm, R(Sm)) with y=p(X_out(x)−X_in(x))+r. The method is applied to the results of line pattern measurements obtained by using an electron microscope capable of measuring lengths, that is, by using a CD-SEM.

The observation device, the recording device, and the processing unit employed in this embodiment are all the same as those in the fifth embodiment.

Figure 23:
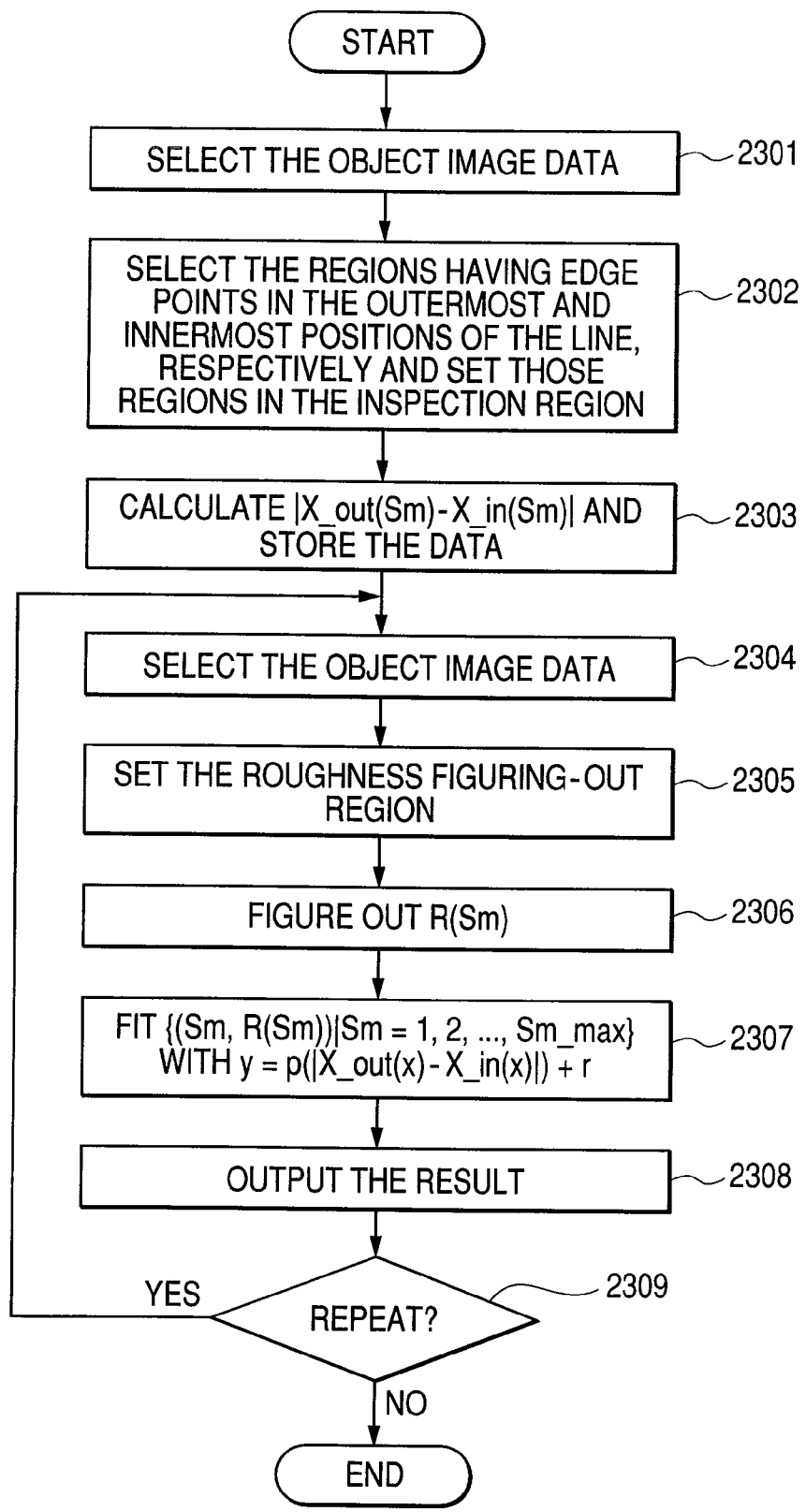
FIG. 23 is a flowchart of the processings in the sixth embodiment.

This sixth embodiment will be described with reference to FIGS. 17 and 23. FIG. 17 shows a CD-SEM image of a pattern analyzed in this embodiment, that is, an explanatory view of two-dimensional distribution data of a secondary electron signal and a processing region determined on the image. FIG. 23 is a flowchart of the procedures carried out in this embodiment.

The same images as those in the first to fifth embodiments are used in this embodiment.

At first, object image data was selected in step 2301 to obtain a fitting function, then the selected image data was displayed on the monitor screen. The image data was the same as that of the secondary electrons intensity distribution shown in FIG. 17. In step 2302, two regions were specified. Those regions had edges disposed in the outermost and innermost portions from the line center in the image.

Then, control went to step 2303 to calculate the dependency of the outermost edge point on the Sm value and the dependency of the innermost edge point on the Sm value, then the absolute value |X_out(Sm)−X_in(Sm)| of the difference was calculated and stored in the memory.

Then, in step 2304, an object image was selected to calculate the roughness. The same image as the above one was selected here. After that, control went to step 2305 to set a region on the image so as to calculate the roughness therein. The region was 1704, which was the same as that in the fourth embodiment. Then, in step 2306, the data in this region was processed just like in the fourth embodiment to calculate noise eliminated roughness R(Sm) with respect to the Sm values varied sequentially from 1 to 21. FIG. 20 is a graph showing the dependency of the calculated roughness on the SM value. In FIG. 20, the noise influence could not be eliminated completely at SM=1 and 3, so the roughness measurement was impossible.

After that, control went to step 2307 to carry out fitting for the data obtained in step 2306 with y=p|X_out(x)−X_in(x)|+r. The data was regarded as y=R(x) at this time. The least squares method was used for the fitting. Then, in step 2308, the most appropriate fitting parameters for the experimental data were displayed on the monitor screen. The parameter values were p=0.48 and r=7.51 nm. Consequently, it was found that the real roughness obtained without smoothing was 7.51 nm.

After that, control went to step 2309 to decide whether to calculate the real roughness with use of |X_out(Sm)−X_in(Sm)|. If the check result was "YES", control returned to step 2304 to carry out the processing in the step of selecting an object image for which roughness measurement was to be made.

The method in this embodiment was effective to calculate the true roughness after eliminating image processing influences, thereby the measurement yield was improved. Although descriptions have been made for a configuration of a scanning type electron microscope (CD-SEM) capable of measuring lengths as a typical example of a micropattern shape evaluation system, the present invention can also apply to the measurement results obtained by using any microscopes other than the CD-SEM. Furthermore, the present invention can apply not only to the line and space patterns, but also, of course, to more complicated shape patterns such as contact hole patterns, OPC patterns, etc.

The method and system of the present invention used to evaluate pattern shapes is intended to obtain values closer to their true ones with less damage when figuring out the sizes (length) and edge roughness of patterns from pattern images in inspection processes for fabricating semiconductors. With use of this method and system, indexes of pattern shapes directly related to the semiconductor devices to be fabricated can be found quickly and accurately, thereby improving the measurement yield.

What is claimed is:

1. A measurement system capable of figuring out a position of an edge of a pattern by finding a two-dimensional intensity distribution of a signal obtained from a patterned sample through observation by a microscope, wherein, when one of an edge of a pattern and the pattern in the two-dimensional intensity distribution is that of a line of the pattern or the line pattern itself, a first image processing is initially carried out to calculate an average of the two-dimensional signal intensity distribution for a given portion of the pattern, which given portion of the pattern includes both right and left edges of the line, by specifying a number of pixels, each with a two dimensional signal intensity, to be averaged in a direction perpendicular to the edges or line by specifying a first smoothing parameter Sm value, then another imaging processing is subsequentially carried out to calculate the edge position or the line width with respect to each of a plurality of subsequent smoothing parameter Sm values that are varied sequentially, thereby figuring out the dependency of each calculated edge position or line width on each one of the first and plurality of subsequent smoothing parameter Sm values.

2. The measurement system according to claim 1, wherein the system is also capable of estimating a value of the edge position or line width by fitting the dependency of the edge position or line width on the edge position or line width smoothing parameter Sm with a function if the averaging is not carried out in the direction perpendicular to the edge position or line width.

3. The length measurement system according to claim 1, wherein, in addition to the figuring-out of the dependency of the edge position or line width on the edge position or line width smoothing parameter Sm, the system is also capable of figuring out the dependencies B(Sm) and N(Sm) of the edge position on the Sm parameter with respect to a widest band-like region and a narrowest band-like region selected from an inspection region of the pattern, and thereby figuring out a difference between those dependencies B(Sm) and N(Sm), with each band-like region being equivalent to an edge of the pattern.

4. The measurement system according to claim 3, wherein the widest and narrowest band-like region are selected automatically in the inspection region.

5. The measurement system according to claim 1, wherein, in addition to the image processing that calculates the dependency of the edge position or line width on the smoothing parameter Sm, the system also includes a processing that calculates how much outermost noticeable and innermost noticeable edge points, in a group of edge points, are shifted from the line due to an increase of the Sm value, that is, a processing that calculates X_out(Sm) and X_in(Sm), and that then calculates a difference between the X_out(Sm) and the X_in(Sm).

6. The measurement system according to claim 3, wherein an outermost noticeable edge point and an innermost noticeable edge point with respect the line are selected automatically.

* * * * *